(12) United States Patent
Vande Sande et al.

(10) Patent No.: US 11,007,920 B2
(45) Date of Patent: May 18, 2021

(54) VEHICLE RESTRAINT SYSTEM FOR GRATED DRIVING SURFACES

(71) Applicant: Trinity Rail Group, LLC, Dallas, TX (US)

(72) Inventors: Jerry W. Vande Sande, Dallas, TX (US); Robert J. Cencer, Tipton, MI (US); Kenneth W. Huck, Fairview, TX (US)

(73) Assignee: TRINITY RAIL GROUP, LLC, Dallas, TX (US)

( * ) Notice: Subject to any disclaimer, the term of this patent is extended or adjusted under 35 U.S.C. 154(b) by 85 days.

(21) Appl. No.: 16/383,804

(22) Filed: Apr. 15, 2019

(65) Prior Publication Data

US 2019/0315263 A1 Oct. 17, 2019

Related U.S. Application Data

(60) Provisional application No. 62/658,132, filed on Apr. 16, 2018.

(51) Int. Cl.

| | | |
|---|---|---|
| *B60P 7/08* | (2006.01) | |
| *B60P 3/075* | (2006.01) | |
| *B61D 45/00* | (2006.01) | |
| *B63B 25/00* | (2006.01) | |
| *B64D 9/00* | (2006.01) | |

(52) U.S. Cl.
CPC ............. *B60P 3/075* (2013.01); *B60P 7/083* (2013.01); *B60P 7/0807* (2013.01); *B61D 45/001* (2013.01); *B63B 25/002* (2013.01); *B64D 9/00* (2013.01)

(58) Field of Classification Search
CPC ......... B60P 3/075; B60P 7/0807; B60P 7/083; B60P 3/077; B60P 3/079; B61D 45/001; B61D 3/02; B61D 3/18; B63B 25/002; B63B 25/008; B64D 9/00; B64C 1/20; B60T 3/00
USPC .................... 410/19–21, 23, 30, 49, 50, 100
See application file for complete search history.

(56) References Cited

U.S. PATENT DOCUMENTS

| | | | | |
|---|---|---|---|---|
| 5,584,622 | A  * | 12/1996 | Dickerson, Sr. | ........ B60P 3/075 410/10 |
| 8,047,751 | B2 * | 11/2011 | Powers | ..................... B60T 3/00 410/20 |
| 8,517,646 | B2 |  8/2013 | Cencer | |
| 2013/0216324 | A1 * | 8/2013 | Tatina | ..................... B60P 3/075 410/3 |
| 2017/0106779 | A1 * | 4/2017 | Morin | ..................... B60P 3/075 |

* cited by examiner

*Primary Examiner* — Stephen T Gordon
(74) *Attorney, Agent, or Firm* — Baker Botts, LLP

(57) ABSTRACT

A system for restraining a vehicle includes a deck of a transport. The deck includes one or more grated panels. The system also includes a vehicle restraint assembly configured to secure a vehicle to the deck of the transport. The vehicle restraint assembly includes an anchor coupled to a first end of a strap. The anchor includes a first plurality of hooks configured to couple the anchor to the deck of the transport through one or more grate wires of the one or more grated panels. The vehicle restraint assembly further includes a ratchet coupled to a second end of the strap. The ratchet includes a second plurality of hooks configured to couple the ratchet to the deck of the transport through one or more grate wires of the one or more grated panels.

19 Claims, 28 Drawing Sheets

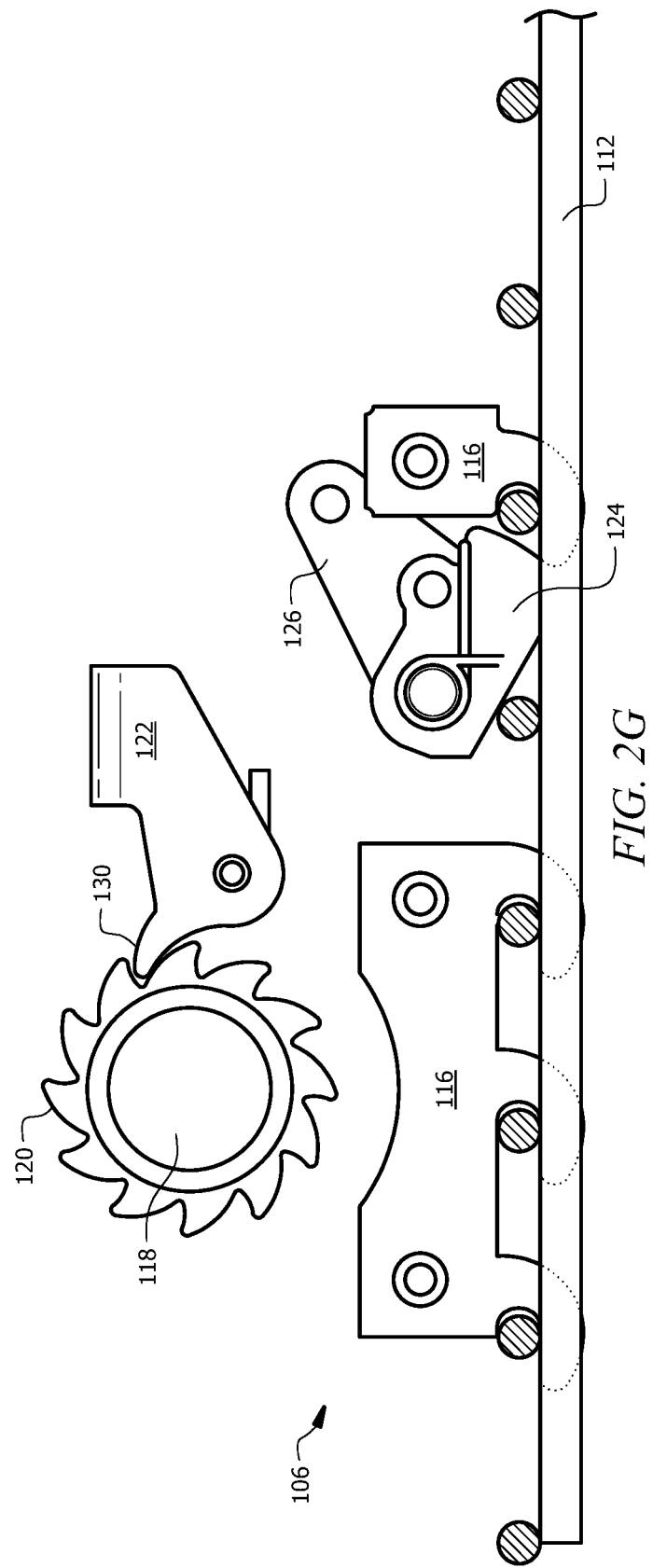

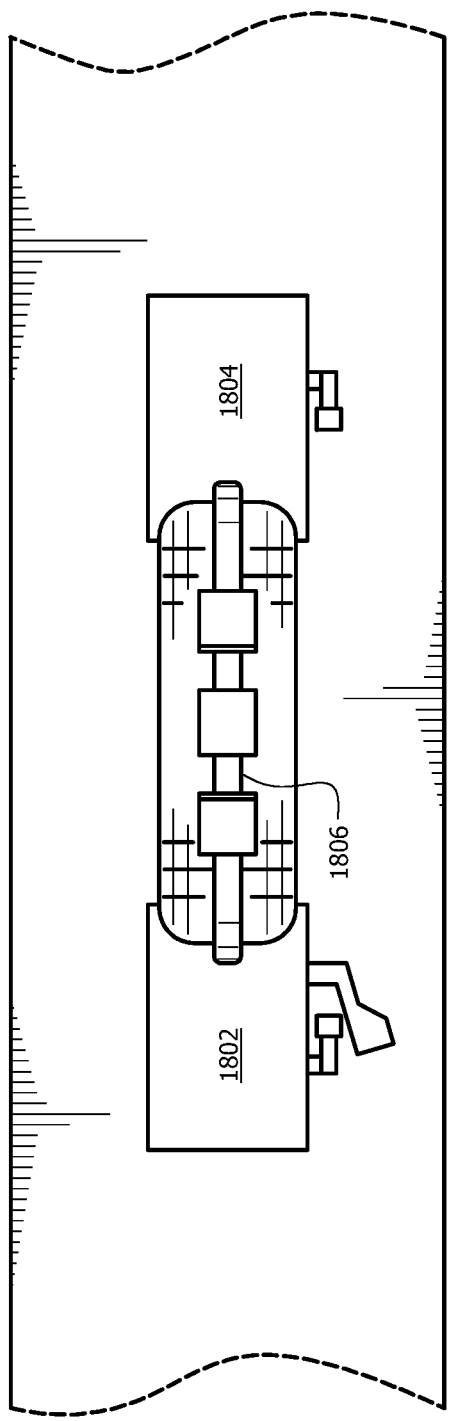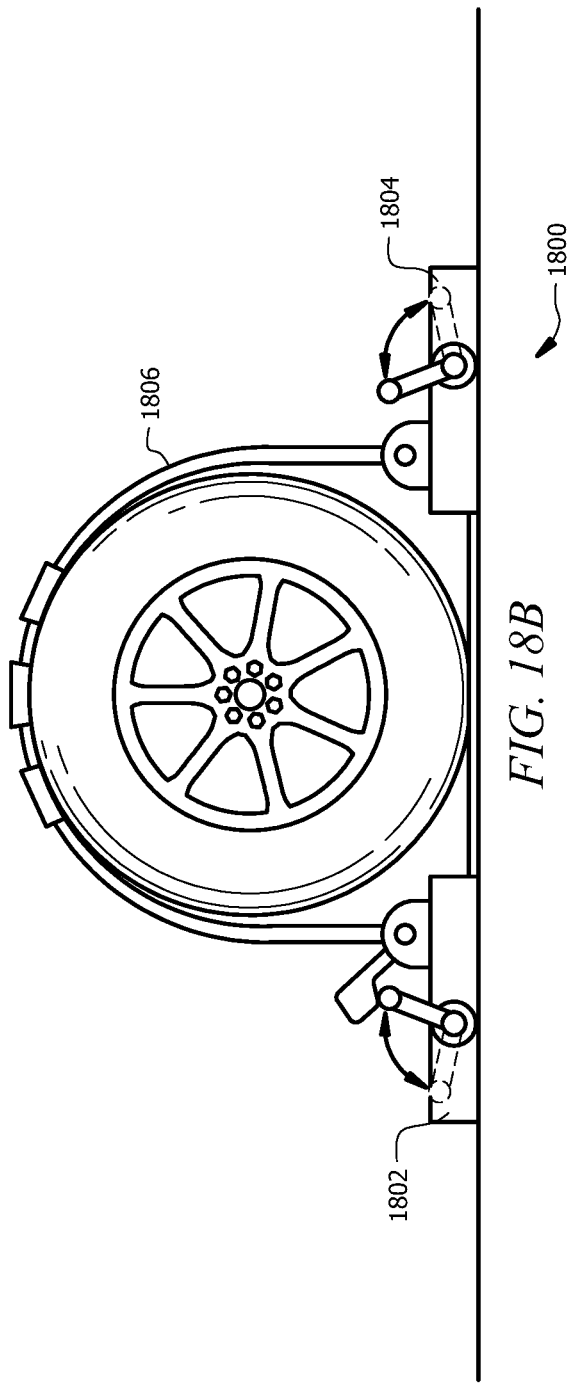
FIG. 18A
FIG. 18B

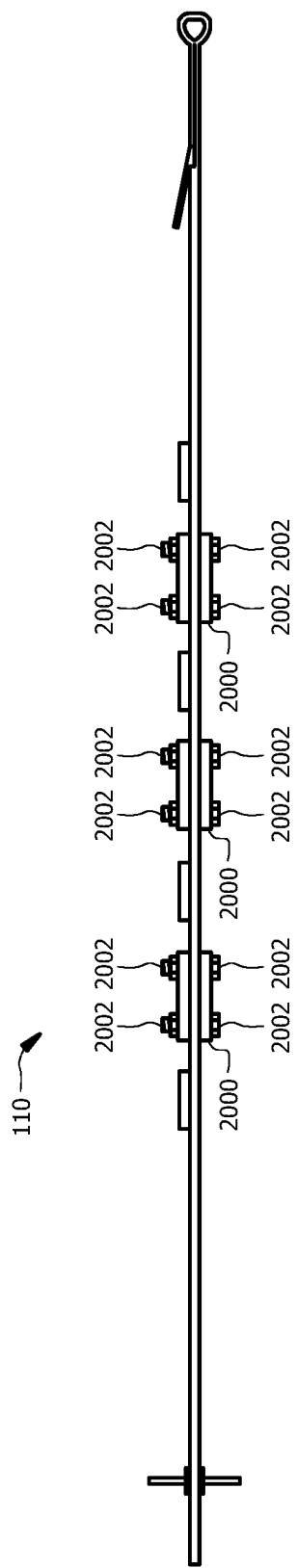

VEHICLE RESTRAINT SYSTEM FOR GRATED DRIVING SURFACES

CROSS-REFERENCE TO RELATED APPLICATION

This application claims the benefit of priority under 35 U.S.C. § 119(e) of U.S. Provisional Application Ser. No. 62/658,132 entitled "Vehicle Restraint System for Grated Driving Surfaces" filed Apr. 16, 2018.

TECHNICAL FIELD

The present disclosure relates generally to transports, and more particularly to a vehicle restraint with a strap for grated driving surfaces.

BACKGROUND

Automobile manufacturers often transport vehicles via railroad lines on multi-deck railcars, such as autoracks. Conventional systems for restraining vehicles during transport vary depending on the type of autorack. For example, autoracks with grated driving surfaces typically employ wheel chocks that attach to steel wire grated panels fastened to the driving surface of a deck of the autorack, while autoracks with track mandrels employ wheel chocks that attach to and are cantilevered over a raised "hat" shaped steel extrusion welded to the deck adjacent to the driving surface. Traditionally, wheel chocks that attach to a grated driving surface of an autorack are designed to effectively secure larger vehicles (e.g., SUVs and trucks), but not smaller vehicles (e.g., sedans). Moreover, existing wheel chocks are often too bulky and too tall for smaller vehicles and do not meet the low profile required to ship those vehicles. As a result, if a smaller vehicle rolls over an existing chock due to a high-impact force during transportation, the inner fender wells of the vehicle may be damaged.

SUMMARY

The teachings of the present disclosure relate to a system and method for restraining a vehicle to a grated driving surface. In accordance with one embodiment, a system for restraining a vehicle includes a deck of a transport. The deck includes one or more grated panels. The system also includes a vehicle restraint assembly configured to secure a vehicle to the deck of the transport. The vehicle restraint assembly includes an anchor coupled to a first end of a strap. The anchor includes a first plurality of hooks configured to couple the anchor to the deck of the transport through one or more grate wires of the one or more grated panels. The vehicle restraint assembly further includes a ratchet coupled to a second end of the strap. The ratchet includes a second plurality of hooks configured to couple the ratchet to the deck of the transport through one or more grate wires of the one or more grated panels.

In accordance with another embodiment, a method for restraining a vehicle includes positioning a strap of a vehicle restraint assembly over a portion of a tire of a vehicle to secure the vehicle to a deck of a transport. The deck includes one or more grated panels. The method further includes coupling a first end of the strap to an anchor of the vehicle restraint assembly. The anchor includes a first plurality of hooks. The method also includes coupling the first plurality of hooks of the anchor to the deck of the transport through one or more grate wires of the one or more grated panels. In addition, the method includes coupling a second end of the strap to a ratchet of the vehicle restraint assembly. The ratchet includes a second plurality of hooks. The method further includes coupling the second plurality of hooks of the ratchet to the deck of the transport through one or more grate wires of the one or more grated panels.

In accordance with yet another embodiment, a system for restraining a vehicle includes a deck of a transport. The deck includes one or more grated panels. The one or more grated panels include a first plurality of grate wires running transversely from a first side of the deck to a second side of the deck and a second plurality of grate wires running longitudinally from a first end of the deck to a second end of the deck. The first plurality of grate wires and the second plurality of grate wires overlap one another to create a mesh pattern. The system further includes a vehicle restraint assembly configured to secure a vehicle to the deck of the transport. The vehicle restraint assembly is also configured to be coupled to the deck of the transport though one or more of the first plurality of grate wires and one or more of the second plurality of grate wires.

Technical advantages of particular embodiments include a low-profile vehicle wheel restraint system that eliminates the high profile of a traditional chock face. Such a system may prevent or reduce damage to vehicle inner fender wells resulting from vehicles (e.g., passenger vehicles, light trucks, SUVs, CUVs, and minivans) rolling over wheel chocks due to high-impact forces during transportation.

Further technical advantages of particular embodiments may include a universal vehicle restraint system comprising a ratchet, an anchor, and a strap configured to secure large and small vehicles alike. By using a strap, in addition to a ratchet and an anchor, both small and large vehicles may be prevented from moving back and forth and side to side due to certain forces occurring during transportation, which in turn prevents such vehicles from rolling over the ratchet or the anchor.

Another technical advantage of particular embodiments may include a vehicle restraint system comprising a strap for restraining the vehicle to a grated driving surface of an autorack. In such embodiments, the strap may break during high loads to prevent and/or reduce damage to the grate of the grated driving surface. In addition to, or alternatively, the strap may be elastic or comprise elastomeric components that allow the strap to stretch, thereby preventing and/or reducing damage to the grate from high-impact forces.

An additional technical advantage of particular embodiments may include lower ratchet and anchor bodies that allow for greater perimeter strap contact with a tire of a vehicle being secured, as compared to wheel chocks of traditional vehicle restraint systems, thereby increasing friction holding power.

Yet another technical advantage of particular embodiments may include a vehicle restraint system comprising an anchor mandrel mounted with a torsional spring that will play out the strap during high-strap forces to prevent and/or reduce grate damage.

A further technical advantage of particular embodiments may include an anchor and/or ratchet mandrel comprising a friction or mechanical clutch to allow the strap mandrel to spin during high-strap forces to prevent and/or reduce grate damage.

An additional technical advantage of particular embodiments may include a vehicle restraint system with one or more hooks made from spring steel configured to release during high-strap forces to prevent and/or reduce damage to the grate.

Additional technical advantages may include providing a vehicle restraint system that may be used in uni-level, bi-level, tri-level, articulated multi-level, and any other single- or multi-level autorack railcars, as well as convertible autorack railcars. Such a system accommodates small and large vehicles alike, regardless of variations in size and wheel track width, which in turn reduces the costs associated with operating and manufacturing transports, and in particular autoracks.

Yet another technical advantage may include a vehicle restraint system with a body made from a light-weight engineered plastic with steel inserts for reinforcement, hooks, mandrels, ratchets, pawls, levers, axles, and fasteners. In addition, the bodies may be half the width of traditional chocks such that two bodies can be stored in the same storage device used to store a single existing chock.

Further technical advantages of particular embodiments may include a vehicle restraint system comprising ratchet and anchor bodies that extend off the grate past the hinge to prevent the grate from lifting when an upward strap force occurs.

Other technical advantages will be readily apparent to one of ordinary skill in the art from the following figures, descriptions, and claims included herein. Moreover, while specific advantages have been enumerated above, certain embodiments of the invention may include all, some, or none of the enumerated advantages.

BRIEF DESCRIPTION OF THE DRAWINGS

A more complete and thorough understanding of the particular embodiments and advantages thereof may be acquired by referring to the following description taken in conjunction with the accompanying drawings, in which like reference numbers indicate like features, and wherein:

FIGS. 2A through 2J illustrate side and perspective views of an example of a system for restraining a vehicle in accordance with an embodiment of the present disclosure;

FIGS. 18A and 18B illustrate a top view and a side view, respectively, of another example of a system for restraining a vehicle in accordance with an embodiment of the present disclosure;

FIG. 20 illustrates a side view of an example of a strap of a system for restraining a vehicle in accordance with an embodiment of the present disclosure.

DETAILED DESCRIPTION

Figure 1A:
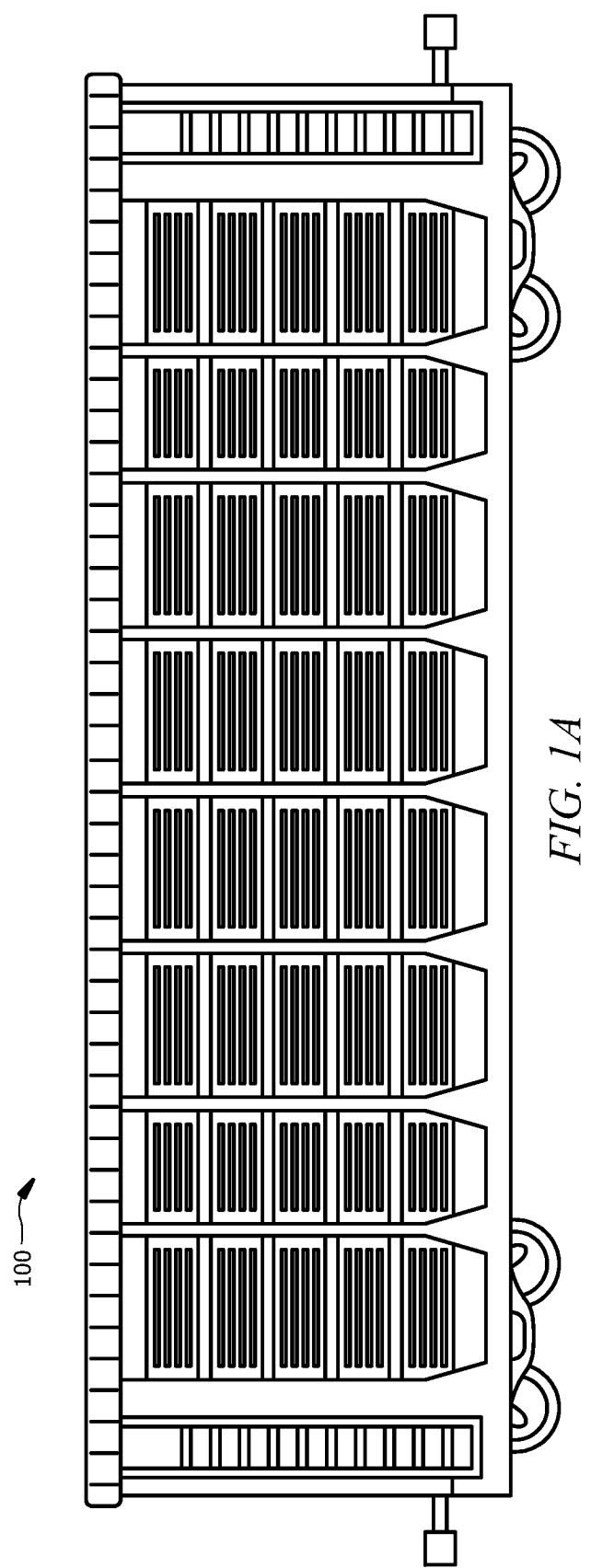
FIGS. 1A through 1B illustrate an example transport of a system for restraining a vehicle in accordance with an embodiment of the present disclosure.

Particular embodiments of the present disclosure and its advantages are best understood by reference to FIGS. 1A through 21 of the drawings, like numerals being used for like and corresponding parts of the various drawings.

Automobile manufacturers often transport vehicles via railroad lines on multi-deck railcars, such as autoracks. Conventional systems for restraining vehicles during transport vary depending on the type of autorack. For example, autoracks with grated driving surfaces typically employ wheel chocks that attach to steel wire grated panels fastened to the driving surface of a deck of the autorack, while autoracks with track mandrels employ wheel chocks that attach to and are cantilevered over a raised "hat" shaped steel extrusion welded to the deck adjacent to the driving surface. Traditionally, wheel chocks that attach to a grated driving surface of an autorack are designed to effectively secure larger vehicles (e.g., SUVs and trucks), but not smaller vehicles (e.g., sedans). Moreover, existing wheel chocks are often too bulky and too tall for smaller vehicles and do not meet the low profile required to ship those vehicles. As a result, if a smaller vehicle rolls over an existing chock due to a high-impact force during transportation, the inner fender wells of the vehicle may be damaged. The teachings of the present disclosure recognize that it would be desirable to provide a system and method for restraining a vehicle to a grated driving surface that will prevent and/or reduce damage to smaller vehicles during transport.

In general, an example system for restraining a vehicle includes a low-profile vehicle restraint assembly comprising a ratchet, an anchor, and a strap. The ratchet and anchor may be shorter and narrower than conventional chocks of existing vehicle restraint systems. For example, the ratchet and anchor of the present disclosure may be 3.5 inches tall, 5 inches wide, and 7 to 8 inches long, while conventional chocks may be 8 to 9 inches tall, 8 to 9 inches wide, and 12 to 14 inches long. By utilizing a ratchet, an anchor, and a strap, the vehicle restraint system of the present disclosure may provide both longitudinal and vertical restraint, thereby preventing a vehicle being restrained from moving up and down and side to side. In addition, the lower ratchet and anchor bodies may allow for greater perimeter strap contact with a tire of a vehicle being secured, as compared to wheel chocks of traditional vehicle restraint systems, thereby increasing friction holding power.

To secure a vehicle to a grated driving surface of a deck of a transport, the ratchet may be coupled to the grated driving surface via one or more grate wires on a first side of a tire of a vehicle, and the anchor may be coupled to the grated driving surface via one or more grate wires on a second side of the tire of the vehicle. Next, one end of the strap may be coupled to the anchor. The strap then may be positioned over a portion of the tire of a vehicle and another end of the strap may be coupled to the ratchet. In certain embodiments, the strap may be tightened around the tire of the vehicle using one or more components of the ratchet.

Figure 1B:
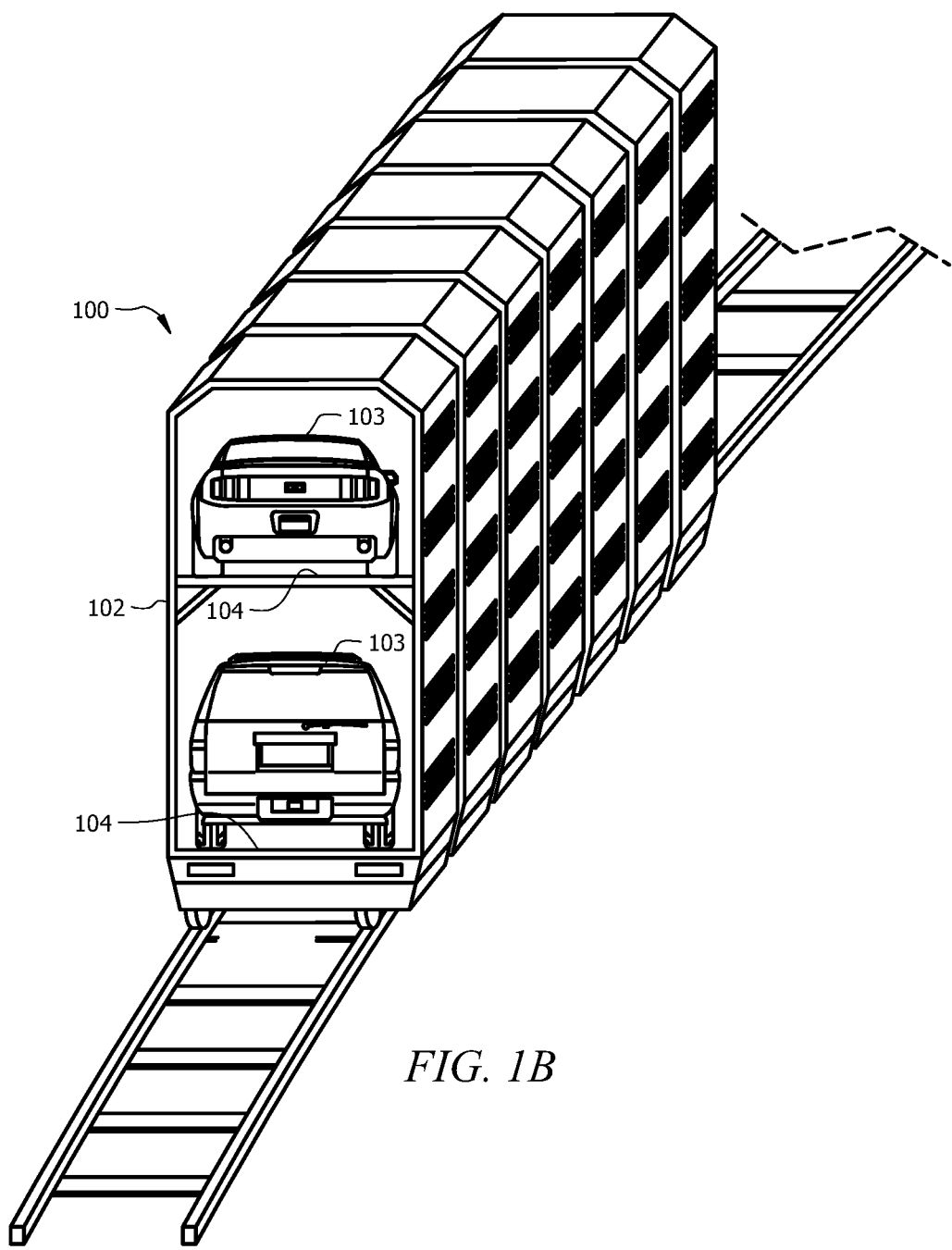

FIGS. 1A through 1B illustrate an example transport of a system for restraining a vehicle in accordance with an embodiment of the present disclosure. System 100 generally refers to a low-profile vehicle restraint assembly for securing vehicles during shipment. In particular, system 100 may be used to secure any type of vehicle (e.g., passenger vehicles, light trucks, SUVs, CUVs, and minivans) to a deck of a transport (e.g., a deck of an autorack) and may reduce and/or eliminate damage resulting from a jumped chock. As explained in more detail below with respect to FIGS. 2A through 3, a vehicle restraint assembly of system 100 generally includes a ratchet, an anchor, and a strap coupled to the ratchet and the anchor and configured to be positioned over a tire of a vehicle to secure the vehicle to the deck of the transport.

System 100 may be implemented in any type of autorack and/or other transport, such as a transport 102. A transport 102 may comprise any type of carrier capable of transporting vehicles 103 and may refer to an autorack 102. Example autoracks 102 may include railcars, trailers, tractor trailers, ships, airplanes, trucks, and/or any other carrier capable of transporting vehicles 103. In certain embodiments, an autorack 102 may be a uni-level autorack (e.g., a railcar comprising one deck), a bi-level autorack (e.g., a railcar comprising two decks), a tri-level autorack (e.g., a railcar comprising three decks), an articulated multi-level autorack, a convertible autorack, or any other type of autorack or other suitable transport. It should be understood that this disclosure contemplates system 100 being a universal restraint system for securing any type of vehicle to any type of transport equipped with a grated driving surface.

In general, system 100 facilitates transporting vehicles 103 via transports 102. Examples of vehicles 103 may include cars (e.g., compact cars, sedans, etc.), jeeps, SUVs, trucks, buses, boats, aircrafts, any other automobile, any other machine having one or more tires, and/or any combination of the preceding. The present disclosure contemplates system 100 transporting any type of vehicle 103 of any size.

Figure 2A:
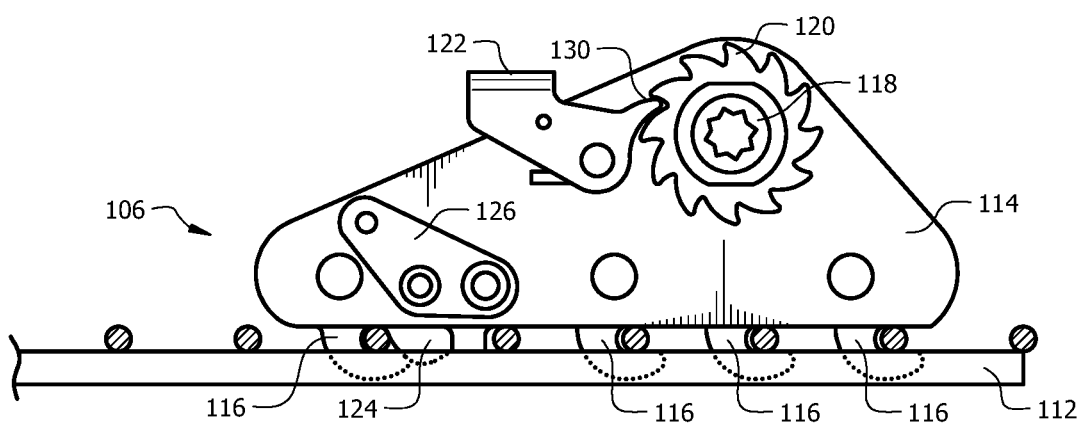
Figure 2B:
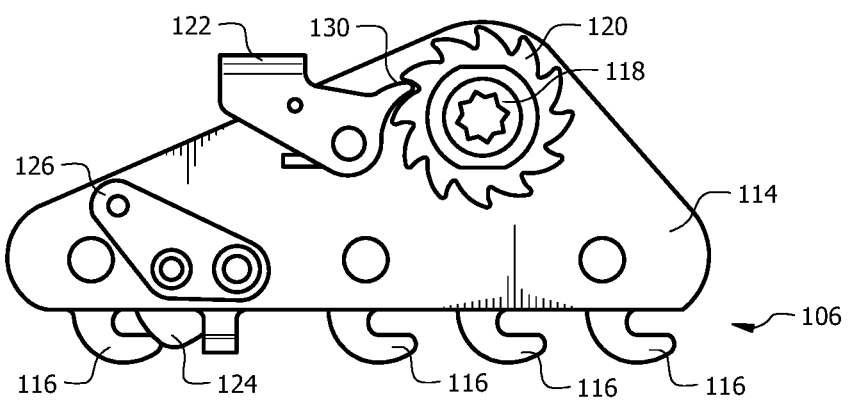
Figure 2C:
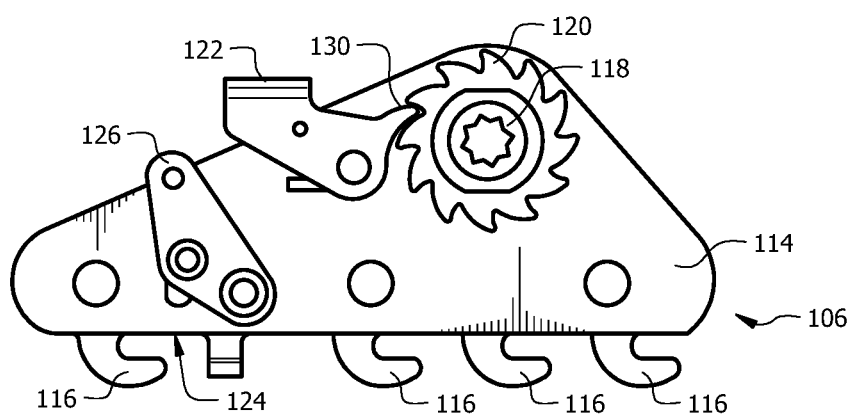
Figure 2D:
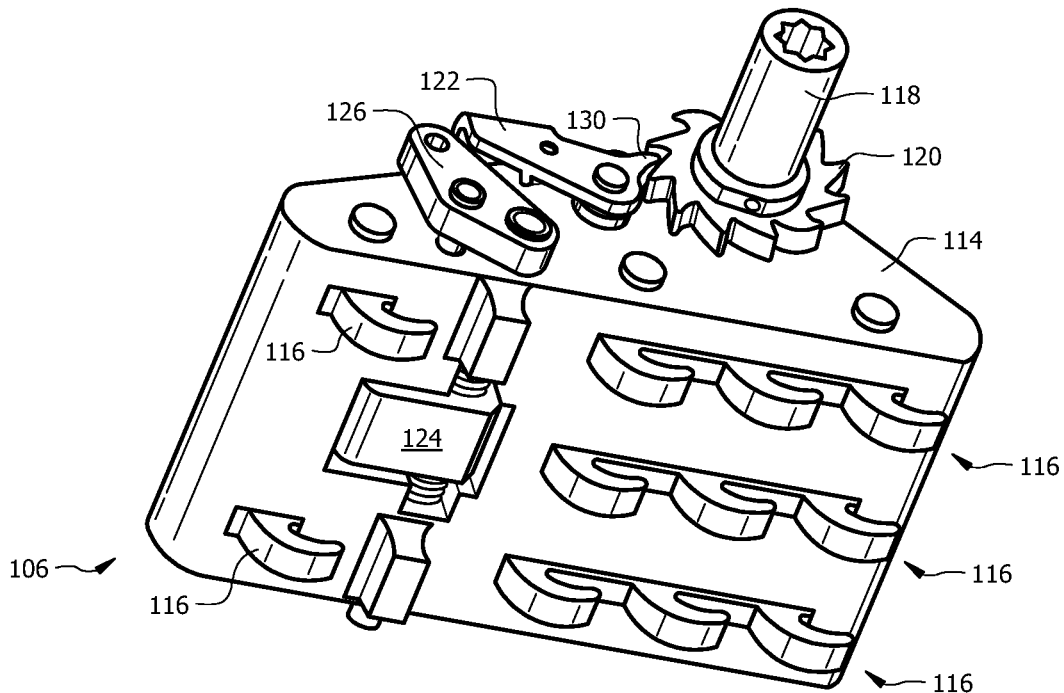
Figure 2E:
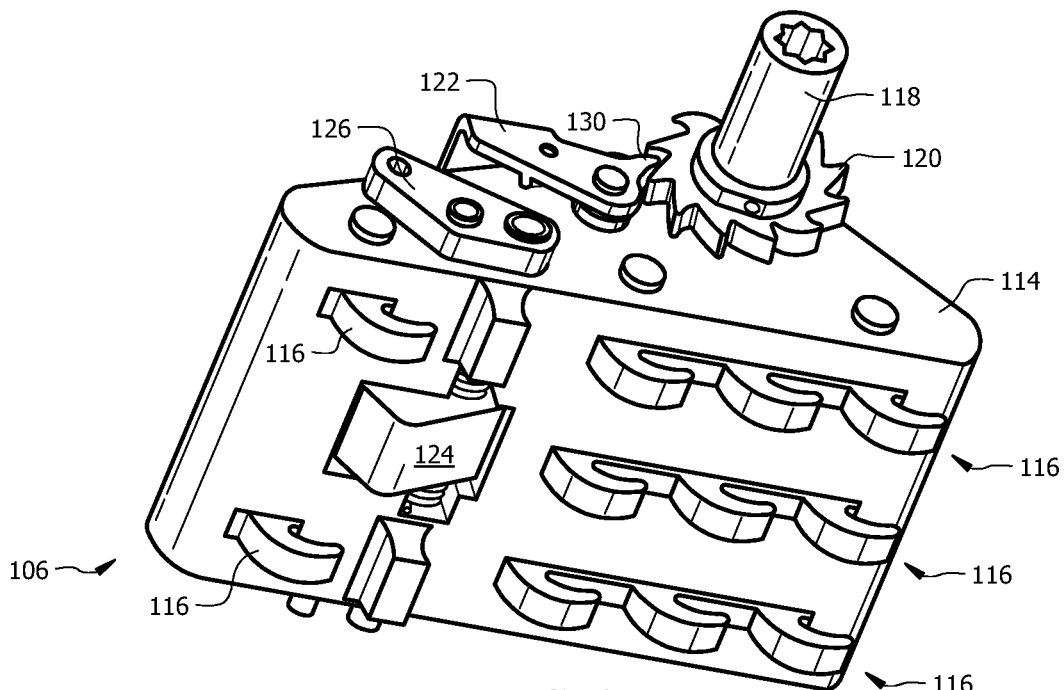
Figure 2F:
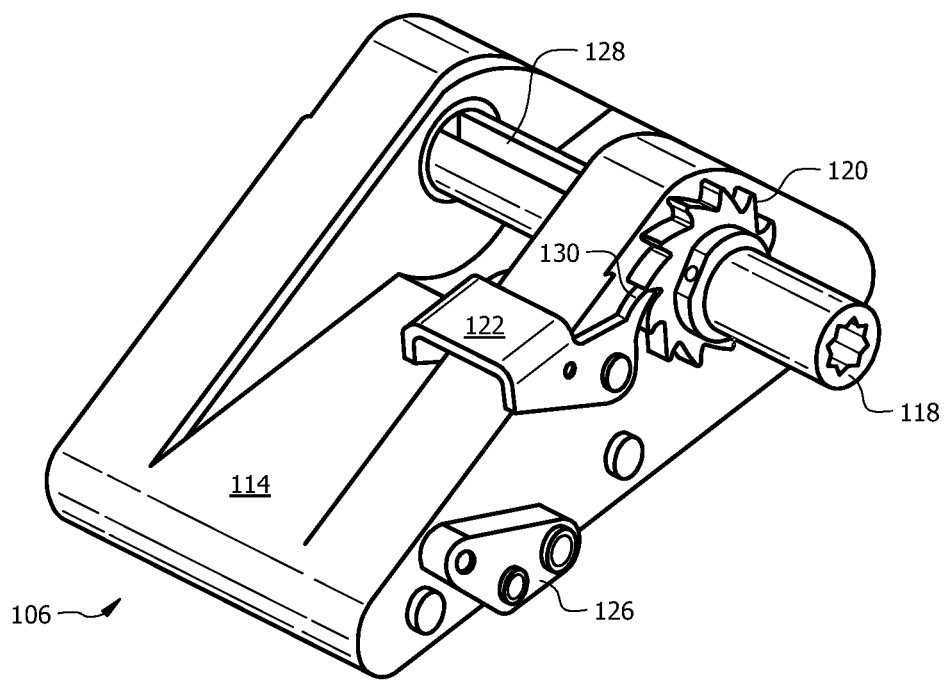
Figure 2H:
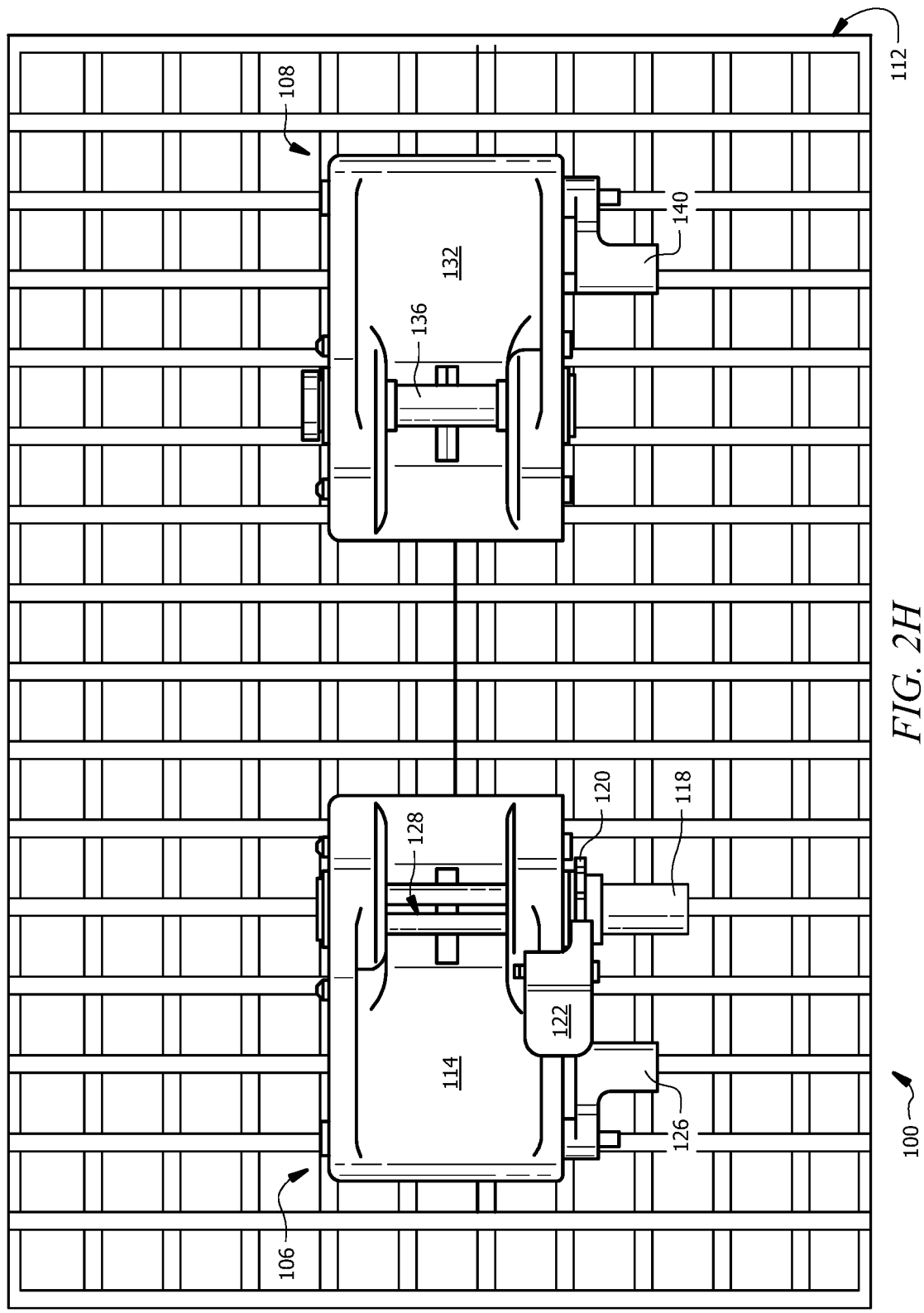
Figure 2I:
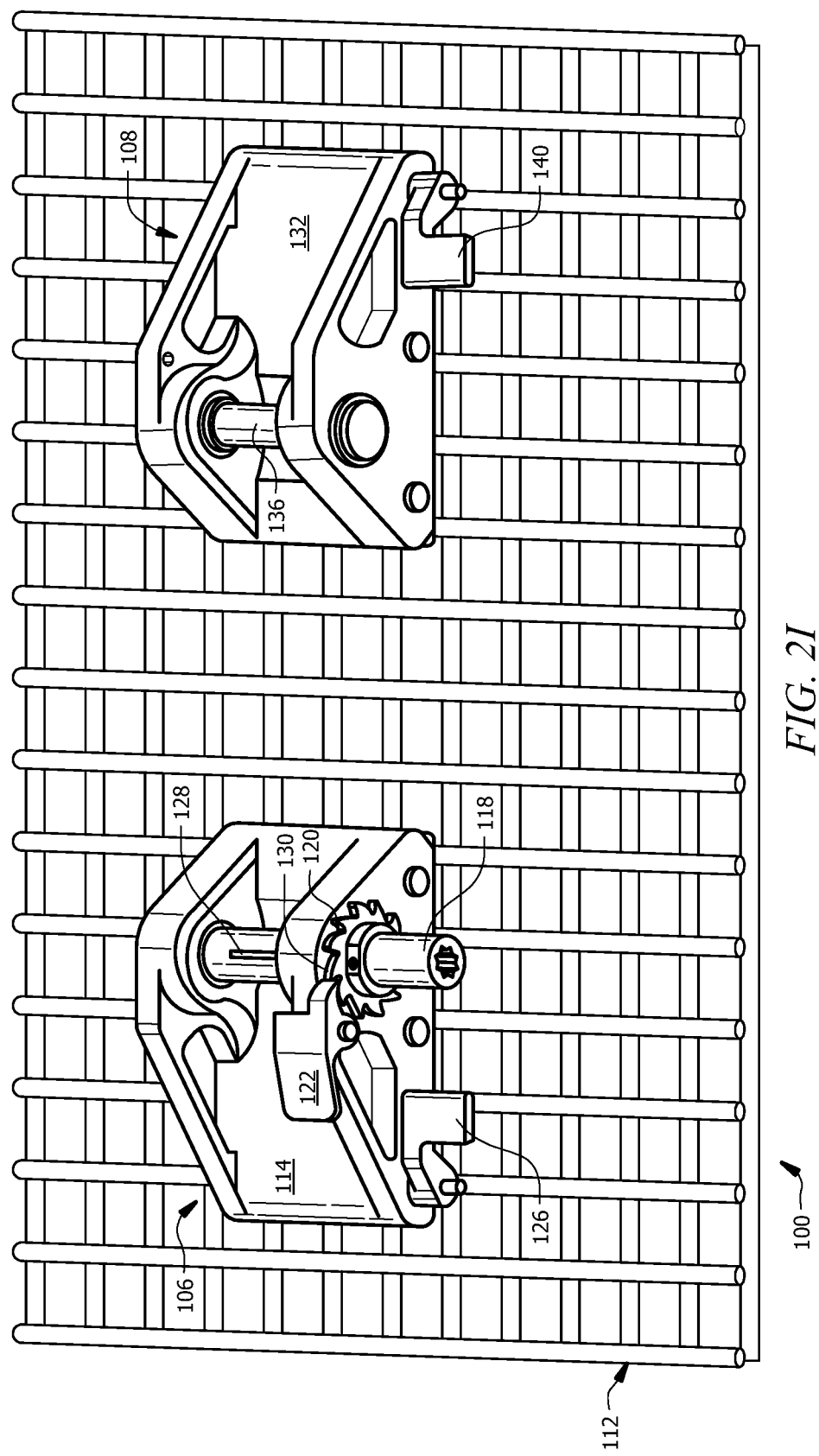

As shown in FIG. 1B, a transport 102 may comprise a plurality of decks 104. A deck 104 may be configured to support one or more vehicles 103. Example decks 104 may be formed from steel and/or any other suitable material. As illustrated in FIGS. 2H and 2I, deck 104 may include a grated driving surface. The grated driving surface may comprise grate wires running transversely (e.g., widthwise from one side of deck 104 to the other) and grate wires running longitudinally (e.g., lengthwise from the front end of deck 104 to the back end of deck 104) that intersect and/or overlap one another to create a mesh pattern. Alternatively, the grate wires may run in any other suitable orientation. In certain embodiments, the grated driving surface of a deck 104 may be formed from Holden grate panels.

Although FIGS. 1A through 1B illustrate system 100 as including one transport 102, two vehicles 103, and two decks 104, system 100 may include any suitable number of transports 102, vehicles 103, and decks 104. Further, although particular examples of transports 102 have been described, this disclosure contemplates any suitable transports 102 comprising any suitable components configured in any suitable manner, according to particular needs.

FIGS. 2A through 2J illustrate side and perspective views of an example of a system for restraining a vehicle in accordance with an embodiment of the present disclosure. As explained in the present disclosure, system 100 may include a ratchet 106, an anchor 108, and a strap 110. In general, ratchet 106 and anchor 108 may be shorter and narrower than conventional chocks of existing vehicle restraint systems. For example, ratchet 106 and anchor 108 may be approximately 3.5 inches tall, 5 inches wide, and 7 to 8 inches long, while conventional chocks may be approximately 8 to 9 inches tall, 8 to 9 inches wide, and 12 to 14 inches long. As a result, ratchet 106 and anchor 108 may provide clearance for low-profile vehicles. The lower bodies of ratchet 106 and anchor 108 may also allow for greater perimeter strap contact with a tire of a vehicle being secured, as compared to wheel chocks of traditional vehicle restraint systems, thereby increasing friction holding power. In addition, by including a strap 110, system 100 may prevent a vehicle from moving side-to-side and back and forth during transport.

System 100 generally uses ratchets 106, anchors 108, and straps 110 to secure vehicles to one or more decks 104 of a transport, such as transport 102, via one or more grated panels 112. Ratchet 106, anchor 108, and strap 110 may be used in place of traditional chock restraint systems. It should be understood that ratchet 106, anchor 108, and strap 110 may collectively be referred to as a vehicle restraint assembly.

Ratchet 106 of the vehicle restraint assembly of system 100 may be configured to be coupled to one or more grate wires of grated panel 112 of deck 104. For example, ratchet 106 may be coupled to grated panel 112 via one or more grate wires on a first side of a tire of vehicle 103. System 100 typically utilizes ratchet 106 to secure one end of a strap 110 to deck 104 via grated panel 112.

A ratchet 106 may include a body 114, hooks 116, mandrel 118, ratchet wheel 120, release lever 122, locking lug 124, lug lever 126, and strap slot 128. Hooks 116, mandrel 118, ratchet wheel 120, release lever 122, locking lug 124, and lug lever 126 may be coupled to body 114. Body 114 may be made from a light-weight engineered plastic, steel, and/or any other suitable material, such as aluminum, galvanized steel, stainless steel, etc. Pivots, bearings, bushings, and/or fraying surfaces may be made from material that does not require lubrication. According to certain embodiments, a body 114 of ratchet 106 may be half the width of a traditional chock such that two bodies 114 may be stored in the same storage device used to store a single traditional chock.

In certain embodiments, body 114 includes steel inserts for reinforcement, hooks, mandrels, ratchet wheels, pawls, levers, axles, and/or fasteners. Additionally, or alternatively, a bottom of a body 114 may comprise molded squares that key into a grated panel 112 (e.g., between longitudinal and cross-car grate wires), and/or molded slots for horizontal and/or vertical grate wires of grate panel 112, thereby preventing horizontal and vertical movement when body 114 is secured to grated panel 112 via hooks 116. Molded slots in a bottom surface of body 114 may each have a raised surface that pinches a respective grate wire to keep body 114 stationary when a strap 110 is being tightened around a tire of a vehicle 103. In certain embodiments, body 114 may comprise any suitable number and combination of mechanisms for locking body 114 to grated panel 112. For example, body 114 may include one or more spring-activated clips configured to snap body 114 to one or more grate wires of grated panel 112 to secure body 114 to grated panel 112 during strap tightening.

In general, ratchet 106 utilizes hooks 116 to engage a grated panel 112 of deck 104 via grate wires of grated panel 112. Hooks 116 may be coupled to or otherwise integrated with body 114 of ratchet 106 and may be made from steel and/or any other suitable material. For example, one or more hooks 116 may be made from spring steel. In such an example, the one or more hooks 116 may release from grated panel 112 during high strap forces to prevent damage to the grate. In certain embodiments, hooks 116 may be P-shaped or T-shaped and each configured to trap a grate wire of a grated panel 112. Alternatively, hooks 116 may be any other suitable shape. In certain embodiments, body 114 may comprise one or more columns and/or one or more rows of hooks 116. For example, as illustrated in FIGS. 2D through 2E, body 114 may include three columns of hooks 116 (two columns with four hooks and one column with three hooks) and four rows of hooks 116 (three rows of three hooks and one row of two hooks).

Hooks 116 are configured to secure body 114 (and ratchet 106) to one or more grated panels 112 of deck 104. In particular, each hook 116 may be configured to capture and lock onto a horizontal grate wire of a grated panel 112 of deck 104. As shown in FIGS. 2A through 2E and 2G, hooks 116 may be forward facing hooks such that the mouths of hooks 116 face towards the tire tread of a vehicle 103 being restrained by system 100. In alternative embodiments, hooks 116 may be rearward facing hooks such that the mouths of hooks 116 face away from the tire tread of a vehicle 103 being restrained by system 100. In certain embodiments, ratchet 106 may include one or more forward facing hooks and one or more rearward facing hooks on a common square axle. In certain embodiments, forward-facing hooks may be fixed hooks and rearward-facing hooks may be rotating hooks (and vice versa). In such embodiments, the rotating hooks may be configured to lock the fixed hooks in place when rotated downward into a locked position via a lever or other suitable mechanism. A secondary lock may be used to prevent the rotating hooks from rotating after being placed in the locked or unlocked position.

In certain embodiments, one or more hooks 116 may be configured with a spring-loaded latch that swings out of the way of a respective grate wire of grated panel 112 when pushed against the grate wire and rotates to the closed position after the grate wire is trapped in a hook such that the latch closes back around the grate wire. Several latches may be mounted on a shaft for hooks 116 along the same grate wire with an operating handle connected to the shaft, and a common spring return. Several of the shafts may be connected by linkage so that two or more rows of latches may be operated by the same handle and spring return. The handle may be rotated to rotate the latches up to allow hooks 116 to uncouple from one or more grate wires of grated panel 112.

Although particular examples of hooks 116 have been described, the present disclosure contemplates any suitable hooks 116 comprising any suitable components configured in any suitable manner, according to particular needs. For example, one or more hooks 116 may be configured to secure ratchet 106 to grated panel 112 by locking onto grate wires running in a longitudinal direction. In such an example, one or more mouths of one or more hooks 116 may face a side of a deck 104 of a transport 102.

Mandrel 118 may be coupled to or otherwise integrated with body 114 of ratchet 106. For example, mandrel 118 may be mounted on a fixed clevis attached to body 114. Alternatively, mandrel 118 may be mounted on a moveable clevis attached to body 114 (as illustrated below in FIGS. 5 through 6 and 12 through 13). In certain embodiments, mandrel 118 may be mounted to body 114 such that mandrel 118 is located close to deck 104 when body 114 is secured to deck 104, thereby preventing contact with the inner fender wells of vehicle 103. The present disclosure contemplates mandrel 118 being mounted to and/or integrated into any portion of body 114, such as a top portion of body 114, an end portion of body 114, and a side portion of body 114.

Mandrel 118 may include a strap slot 128 and may be made from steel and/or any other suitable material. In certain embodiments, mandrel 118 may be made from elastomeric material and/or mounted to body 114 with elastomeric material to absorb shock forces. In addition to, or alternatively, mandrel 118 may comprise a shear pin configured to break during high strap forces and thus reduce and/or prevent damage to a grated driving surface of deck 104 and a vehicle 103 being restrained. In certain embodiments, mandrel 118 may be mounted with a torsional spring that allows strap 110 to play out during high strap forces to prevent damage to a grated driving surface of deck 104. Moreover, mandrel 118 may include a friction or mechanical clutch to allow an axle of mandrel 118 and/or ratchet wheel 120 to spin during high strap forces to prevent damage to a grated driving surface of deck 104, in certain embodiments.

Mandrel 118 may be configured to couple one end of a strap 110 to ratchet 106 via strap slot 128 and operable to rotate to tighten strap 110 around a tire of a vehicle. Release lever 122 of ratchet 106 may keep mandrel 118 from freewheeling when tension is applied during rotation. In certain embodiments, mandrel 118 may rotate freely when release lever 122 is decoupled from mandrel 118 (e.g., for strap removal). In such embodiments, mandrel 118 may be configured with low friction bushings to allow mandrel 118 to freewheel when not restrained. In general, mandrel 118 may facilitate increasing the tension of strap 110 of the vehicle restraint assembly on a tire of a vehicle, while release lever 122 may facilitate decreasing the tension of strap 110 on the tire of the vehicle.

A pawl 130 of release lever 122 may lock rotation of mandrel 118 via a ratchet wheel 120. As such, ratchet 106 (and mandrel 118) may not release the tightening force around a tire of a vehicle unless pawl 130 has been disengaged. In certain embodiments, pawl 130 may be configured such that a downward force rotates mandrel 118 and tightens strap 110. In certain embodiments, when pawl 130 is engaged with ratchet wheel 120, mandrel 118 may rotate freely in one direction. For example, pawl 130 may slip over the teeth of ratchet wheel 120 (even when engaged with the ratchet wheel 120) if mandrel 118 is rotated one direction. On the other hand, pawl 130 may lock mandrel 118 in place if mandrel 118 is rotated another direction. In certain embodiments, release lever 122 may be used to disengage pawl 130 from ratchet wheel 120, and thereby decrease the tension of strap 110 on the tire of the vehicle.

Ratchet 106 may further include a locking lug 124 configured to lock ratchet 106 in place upon hooks 116 of ratchet 106 engaging one or more grate wires of grate panel 112. Locking lug 124 may be spring loaded, for example, to stay in a locked position. More specifically, locking lug 124 may be spring loaded such that when ratchet 106 is placed in position on a grated panel 112, locking luck 124 automatically rotates downward between the grate wires of grated panel 112 and prevents ratchet 106 from moving rearward.

As illustrated in FIGS. 2D through 2E, a locking lug 124 may be positioned between a first row of hooks 116 and a second row of hooks 116. In general, locking lug 124 is configured to prevent hooks 116 from disengaging from grated panel 112 when in the locked position. In certain embodiments, a lug lever 126 may be used to unlock locking lug 124 and thereby disengage hooks 116 from grated panel 112.

In an example operation, ratchet 106 is positioned onto grated panel 112 and then pushed forward to engage hooks 116 with respective grate wires of grated panel 112. Once hooks 116 engage grated panel 112 via grate wires, locking lug 124 may snap down such that one or more grate wires of grated panel 112 are trapped between one or more hooks 116 and locking lug 124. To remove ratchet 106 from grated panel 112, lug lever 126 is pushed upward to release locking lug 124 and ratchet 106 is pushed backward to disengage hooks 116 from the respective grate wires of grated panel 112.

Although particular examples of ratchet 106 have been described, the present disclosure contemplates any suitable ratchet 106 comprising any suitable components configured in any suitable manner, according to particular needs. In addition, any component of ratchet 106 may be separate from or integral to any other component of ratchet 106 and system 100.

Figure 2J:
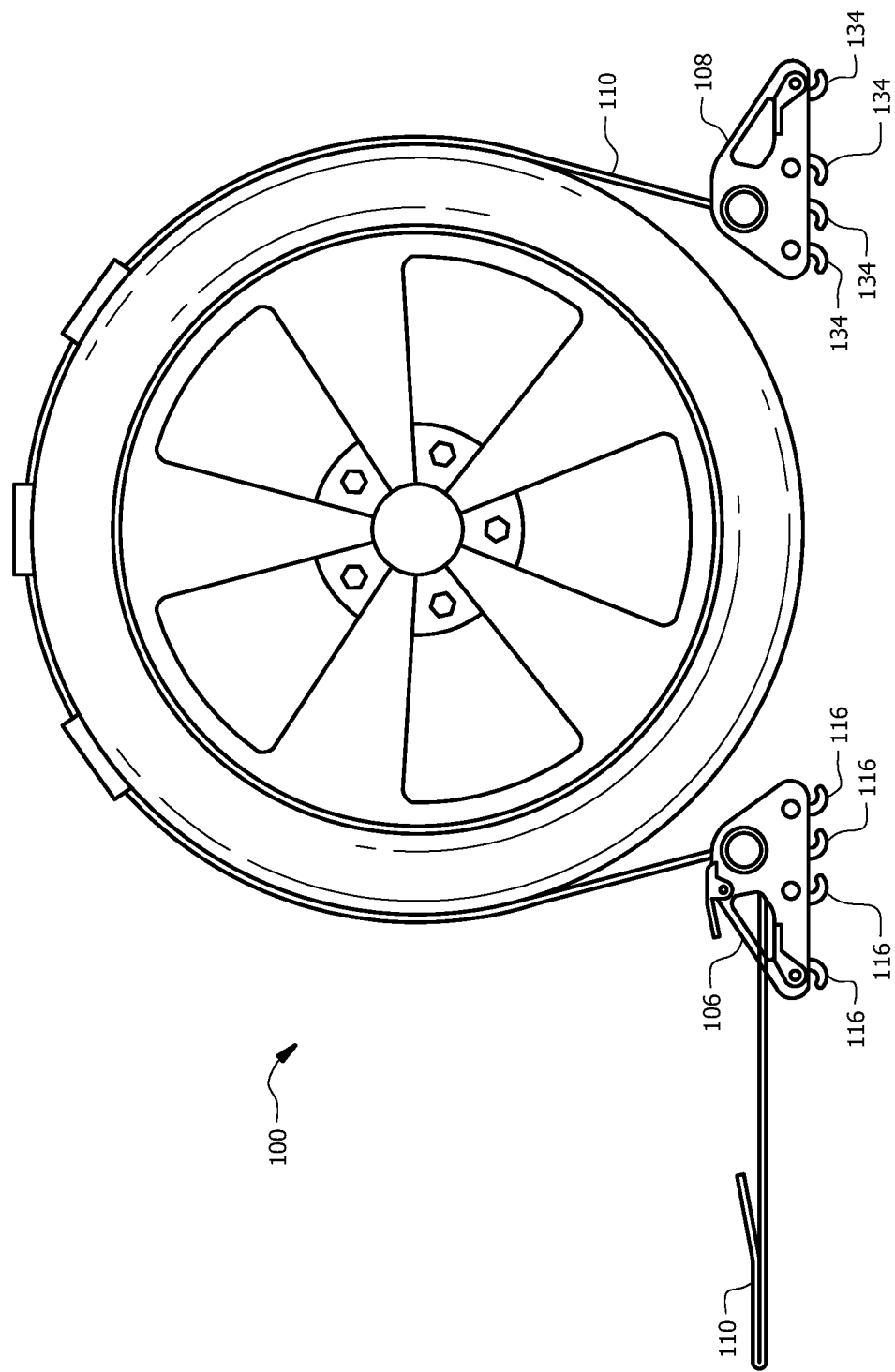

Referring to FIGS. 2H through 2J, an anchor 108 of the vehicle restraint assembly of system 100 may be configured to be coupled to one or more grate wires of grated panel 112 of deck 104. For example, anchor 108 may be coupled to grated panel 112 via one or more grate wires on a second side of a tire of vehicle 103 to facilitate securing vehicle 103 to deck 104. System 100 typically utilizes anchor 108 to secure another end of a strap 110 to deck 104 via grated panel 112. In general, an anchor 108 is coupled to a grated panel 112 in a manner substantially the same as ratchet 106.

An anchor 108 may include a body 132, hooks 134 (not shown), a mandrel 136, a locking lug 138 (not shown), and a lug lever 140. Hooks 134 (not shown), mandrel 136, locking lug 138 (not shown), and lug lever 140 may be coupled to body 132. Body 132 of anchor 108 may be substantially the same as body 114 of ratchet 106. Body 132 of anchor 108 may be made from a light-weight engineered plastic, steel, and/or any other suitable material, such as aluminum, galvanized steel, stainless steel, etc. Pivots, bearings, bushings, and/or fraying surfaces may be made from material that does not require lubrication. According to certain embodiments, a body 132 of anchor 108 may be half the width of a traditional chock such that two bodies 132 may be stored in the same storage device used to store a single traditional chock.

In certain embodiments, body 132 includes steel inserts for reinforcement, hooks, mandrels, levers, axles, and/or fasteners. Additionally, or alternatively, a bottom of a body 132 may comprise molded squares that key into a grated panel 112 (e.g., between longitudinal and cross-car grate wires), and/or molded slots for horizontal and/or vertical grate wires of grate panel 112, thereby preventing horizontal and vertical movement when body 132 is secured to grated panel 112 via hooks 134. Molded slots in a bottom surface of body 132 may each have a raised surface that pinches a respective grate wire to keep body 132 stationary when a strap 110 is being tightened around a tire of a vehicle 103. In certain embodiments, body 132 may comprise any suitable number and combination of mechanisms for locking body 132 to grated panel 112. For example, body 132 may include one or more spring-activated clips configured to snap body 132 to one or more grate wires of grated panel 112 to secure body 132 to grated panel 112 during strap tightening.

In general, anchor 108 utilizes hooks 134 to engage a grated panel 112 of deck 104 via grate wires of grated panel 112. Hooks 134 of anchor 108 may be substantially similar to hooks 116 of ratchet 106. Hooks 134 of anchor 108 may be coupled to or otherwise integrated with body 132 of anchor 108 and may be made from steel and/or any other suitable material. For example, one or more hooks 134 may be made from spring steel. In such an example, the one or more hooks 134 may release from grated panel 112 during high strap forces to prevent damage to the grate. In certain embodiments, hooks 134 may be P-shaped or T-shaped and each configured to trap a grate wire of a grated panel 112. Alternatively, hooks 134 may be any other suitable shape. In certain embodiments, body 132 may comprise one or more columns and/or one or more rows of hooks 134 (e.g., as illustrated in FIGS. 2D and 2E).

Hooks 134 are configured to secure body 132 (and anchor 108) to one or more grated panels 112 of deck 104. In particular, each hook 134 may be configured to capture and lock onto a horizontal grate wire of a grated panel 112 of deck 104. Hooks 134 of anchor 108 may be forward facing hooks such that the mouths of hooks 134 face towards the tire tread of a vehicle 103 being restrained by system 100. In alternative embodiments, hooks 134 may be rearward facing hooks such that the mouths of hooks 134 face away from the tire tread of a vehicle 103 being restrained by system 100. In certain embodiments, anchor 108 may include one or more rearward facing hooks and one or more forward-facing hooks on a common square axle. In certain embodiments, forward-facing hooks may be fixed hooks and rearward-facing hooks may be rotating hooks (and vice versa). In such embodiments, the rotating hooks may be configured to lock the fixed hooks in place when rotated downwards into a locked position via a lever or other suitable mechanism. A secondary lock may be used to prevent the rotating hooks from rotating after being placed in the locked or unlocked position.

In certain embodiments, one or more hooks 134 may be configured with a spring-loaded latch that swings out of the way of a respective grate wire of grated panel 112 when pushed against the grate wire and rotates to the closed position after the grate wire is trapped in a hook such that the latch closes back around the grate wire. Several latches may be mounted on a shaft for hooks 134 along the same grate wire with an operating handle connected to the shaft, and a common spring return. Several of the shafts may be connected by linkage so that two or more rows of latches may be operated by the same handle and spring return. The handle may be rotated to rotate the latches up to allow hooks 134 to uncouple from one or more grate wires of grated panel 112.

Although particular examples of hooks 134 have been described, the present disclosure contemplates any suitable hooks 134 comprising any suitable components configured in any suitable manner, according to particular needs. For example, one or more hooks 134 may be configured to secure anchor 108 to grated panel 112 by locking onto grate wires running in a longitudinal direction. In such an example, one or more mouths of one or more hooks 134 may face a side of a deck 104 of a transport 102.

Mandrel 136 may be coupled to or otherwise integrated with body 132 of anchor 108. For example, mandrel 136 may be mounted on a fixed clevis attached to body 132. Alternatively, mandrel 136 may be mounted on a moveable clevis attached to body 132. In certain embodiments, mandrel 136 may be mounted to body 132 such that mandrel 136 is located close to deck 104 when body 132 is secured to deck 104, thereby preventing contact with the inner fender wells of vehicle 103. The present disclosure contemplates mandrel 136 being mounted to and/or integrated into any portion of body 132, such as a top portion of body 132, an end portion of body 132, and a side portion of body 132.

Mandrel 136 may be made from steel and/or any other suitable material. In certain embodiments, mandrel 136 may be made from elastomeric material and/or mounted to body 132 with elastomeric material to absorb shock forces. In addition to, or alternatively, mandrel 136 may comprise a shear pin configured to break during high strap forces and thus reduce and/or prevent damage to a grated driving surface of deck 104 and a vehicle 103 being restrained. In certain embodiments, mandrel 136 may be mounted with a torsional spring (not shown) that allows strap 110 to play out during high strap forces to prevent damage to a grated driving surface of deck 104. Moreover, mandrel 136 may include a friction or mechanical clutch (not shown) to allow an axle of mandrel 136 to spin during high strap forces to prevent damage to a grated driving surface of deck 104, in certain embodiments.

Mandrel 136 may be configured to couple an end of a strap 110 to anchor 108. For example, an end of strap 110 may be sewn around mandrel 136. As another example, an end of strap 110 may be coupled to mandrel 136 of anchor 108 by a strap buckle. The present disclosure contemplates an end of strap 110 being coupled to anchor 108 in any suitable manner.

Anchor 108 may further include a locking lug 138 configured to lock anchor 108 in place upon hooks 134 of anchor 108 engaging one or more grate wires of grate panel 112. Locking lug 138 may be spring loaded, for example, to stay in a locked position. More specifically, locking lug 138 may be spring loaded such that when anchor 108 is placed in position on a grated panel 112, locking luck 138 automatically rotates downward between the grate wires of grated panel 112 and prevents anchor 108 from moving rearward.

In general, locking lug 138 is substantially similar to and configured in substantially the same manner as locking lug 124 of ratchet 106. As illustrated in FIGS. 2D through 2E with respect to locking lug 124 of ratchet 106, a locking lug 138 of anchor 108 may be positioned between a first row of hooks 134 and a second row of hooks 134. Locking lug 138 is generally configured to prevent hooks 134 from disengaging from grated panel 112 when in the locked position. In certain embodiments, a lug lever 140 may be used to unlock locking lug 138 and thereby disengage hooks 134 from grated panel 112. Like locking lug 138, lug lever 140 of anchor 108 may be substantially similar to lug lever 126 of ratchet 106.

In an example operation, anchor 108 is positioned onto grated panel 112 and then pushed forward to engage hooks 134 with respective grate wires of grated panel 112. Once hooks 134 engage grated panel 112 via grate wires, locking lug 140 may snap down such that one or more grate wires of grated panel 112 are trapped between one or more hooks 134 and locking lug 138. To remove anchor 108 from grated panel 112, lug lever 140 is pushed upward to release locking lug 138 and anchor 108 is pushed backward to disengage hooks 134 from the respective grate wires of grated panel 112.

Although particular examples of anchor 108 have been described, the present disclosure contemplates any suitable anchor 108 comprising any suitable components configured in any suitable manner, according to particular needs. In addition, any component of anchor 108 may be separate from or integral to any other component of anchor 108 and system 100. Furthermore, it should be understood from the present disclosure that anchor 108 of system 100 comprises substantially the same components configured in substantially the same manner as ratchet 106. For example, hooks 134, locking lug 138, and lug lever 140 of anchor 108 may be identical or substantially similar to hooks 116, locking lug 124, and lug lever 126 of ratchet 106.

Referring to FIG. 2J, system 100 generally includes a strap 110 that facilitates securing a vehicle 103 to a deck 104. Strap 110 may be configured to be positioned on a portion of a tire of a vehicle 103 and coupled to one or more grated panels 112 by ratchet 106 and anchor 108 to secure the tire of the vehicle 103 to deck 104. As illustrated, strap 110 may be coupled to grated panel 112 through ratchet 106 and anchor 108 and tightened around the tire of vehicle 103 such that strap 110 wraps around the tire at approximately 270 degrees (e.g., strap 110 may come off the tire at approximately 270-degree tangent points).

Example straps 110 may be composed of one or more of nylon, rubber, cloth, elastic, elastomeric, and/or any other suitable material. A strap 110 composed of elastic or elastomeric components may allow strap 110 to stretch and prevent damage to a grated panel 112 from high strap forces. In certain embodiments, strap 110 may be approximately 1.75" to 2" inches wide. Strap 110 also may have a working load of approximately 2,300 pounds and an ultimate strength of approximately 7,000 pounds.

In general, a first end of strap 110 is coupled to a ratchet, such as ratchet 106, and a second end of strap 110 is coupled to an anchor, such as anchor 108. It should be understood that strap 110 may be coupled to any suitable ratchet and anchor and may be configured in any suitable manner. In certain embodiments, ratchet 106 may be used to tighten strap 110 around a tire of a vehicle 103. In such embodiments, friction is created between the tire tread and strap 110, which in turn retards the tire from rotating during transportation.

Although particular examples of strap 110 have been described, the present disclosure contemplates any suitable strap 110 comprising any suitable components configured in any suitable manner, according to particular needs. In addition, any component of strap 110 may be separate from or integral to any other component of strap 110 and system 100.

As described above with respect to FIGS. 1A through 1B, deck 104 may include a grated driving surface formed from one or more grated panels, such as grated panels 112. A grated panel 112 may be coupled to or otherwise integrated with deck 104, for example, by welds, bolts, and/or any other suitable fasteners. In certain embodiments, one or more sides of a grated panel 112 may be coupled to deck 104 via a hinge connection such that grated panel 112 may be pivoted upwards. In such embodiments, dirt and other debris under grated panel 112 may be cleaned and removed. In certain embodiments, grated panel 112 may include any suitable number of anchors with fasteners to couple grated panel 112 to deck 104 and prevent grated panel 112 from lifting and rotating around a grate hinge.

Each grated panel 112 may facilitate restraining various types of vehicles 103 to deck 104 and may be made from steel and/or any other suitable material. In certain embodiments, grated panels 112 may refer to Holden grating panels. As illustrated in FIGS. 2H through 2I, a grated panel 112 may include a first set of grate wires running transversely (e.g., widthwise from one side of deck 104 to the other) and a second set of grate wires running longitudinally (e.g., lengthwise from the front end of deck 104 to the back end of deck 104) that intersect and/or overlap one another to create a mesh pattern. It should be understood that grated panel 112 may be configured in any suitable manner and comprise grate wires running in any suitable direction and having any suitable orientation.

One or more transverse wires may be welded to one or more longitudinal wires of a grated panel 112 at a location where the one or more transverse wires and the one or more longitudinal wires cross (e.g., intersect in planar view). In certain embodiments, grated panel 112 may include additional transverse grate wires on ¾" on center to make grated panel 112 more rigid and allow for additional welds to the longitudinal grate wires. By including additional grate wires, there are more intersections of transverse and longitudinal grate wires that may be welded and to thereby strengthen grate panel 112.

Grate wires of grated panel 112 may be used to couple ratchet 106 and anchor 108 of the vehicle restraint assembly to grated panel 112 of deck 104. In particular, hooks 116 of ratchet 106 and hooks 134 of anchor 108 may engage grated panel 112 via one or more grate wires and a strap 110 coupled to ratchet 106 and anchor 108 may be tightened around a tire of a vehicle 103 to secure vehicle 103 to deck 104. For example, to secure a tire of vehicle 103 to deck 104, strap 110 may be positioned on a portion of the tire of vehicle 103, a ratchet 106 coupled to one end of strap 110 may be coupled to grated panel 112 by locking each hook 116 of ratchet 106 to a respective grate wire of grated panel 112 on a first side of the tire, and an anchor 108 coupled to another end of strap 110 may be coupled to grated panel 112 by locking each hook 134 of anchor 108 to a respective grate wire of grated panel 112 on a second side of the tire. In such an example, strap 110 may then be tightened around the portion of the tire using mandrel 118 of ratchet 106, thereby securing the tire of the vehicle to deck 104. Thus, grate wires of grated panel 112 facilitate securing a tire of a vehicle to a deck of a transport.

Modifications, additions, or omissions may be made to system 100 without departing from the scope of the disclosure. In addition, although FIGS. 2A through 2J illustrate system 100 as comprising one ratchet 106, one anchor 108, one strap 110, and one grated panel 112, system 100 may comprise any number and combination of ratchets 106, anchors 108, straps 110, and grated panels 112 configured in any suitable manner. Furthermore, although particular examples of decks 104, ratchets 106, anchors 108, straps 110, and grate panels 112 have been described, this disclosure contemplates any suitable decks 104, ratchets 106, anchors 108, straps 110, and grated panels 112 comprising any suitable components configured in any suitable manner, according to particular needs. For example, in certain embodiments, ratchets 106 and anchors 108 may extend off grate panel 112 past the hinge to prevent grate panel 112 from lifting when an upward strap force occurs. Moreover, decks 104, ratchets 106, anchors 108, straps 110, and grated panels 112, and any components thereof, may be separate from or integral to any component of FIGS. 2A through 2J.

Figure 3:
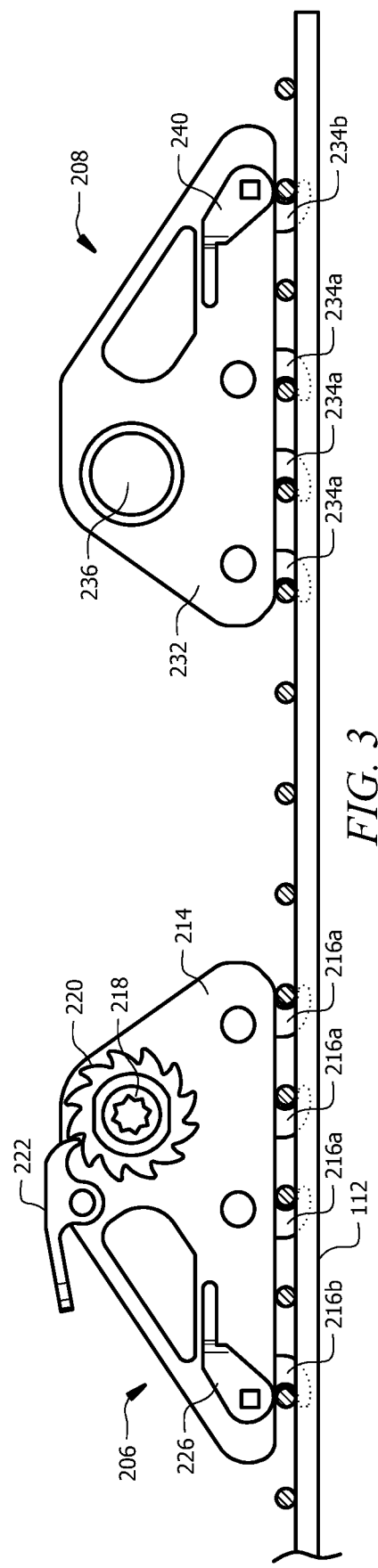
FIG. 3 illustrates a side view of an example of a system for restraining a vehicle in accordance with an embodiment of the present disclosure.

FIG. 3 illustrates a side view of an example of a system for restraining a vehicle in accordance with an embodiment of the present disclosure. System 200 generally facilitates securing a vehicle 103 to a deck 104 of a transport 102 and includes a ratchet 206, an anchor 208, and a strap (e.g., a strap 110 of system 100). System 200 may be substantially similar to system 100 described above with respect to FIGS. 1 through 2J.

Ratchet 206 of the vehicle restraint assembly of system 200 may be configured to be coupled to one or more grate wires of grated panel 112 of deck 104. For example, ratchet 206 may be coupled to grated panel 112 via one or more grate wires on a first side of a tire of vehicle 103. System 200 typically utilizes ratchet 206 to secure one end of a strap 110 to deck 104 via grated panel 112.

A ratchet 206 may include a body 214, hooks 216, mandrel 218, ratchet wheel 220, release lever 222, lever 226, and strap slot 228. In general, body 214, mandrel 218, ratchet wheel 220, release lever 222, and strap slot 228 are substantially similar to body 114, mandrel 118, ratchet wheel 120, release lever 122, and strap slot 128 of system 100 described above with respect to FIGS. 1 through 2J. As illustrated in FIG. 3, ratchet 206 of system 200 may include a first set of hooks, hooks 216a, and a second set of hooks, hooks 216b. Hooks 216a may be forward facing hooks and may be substantially similar to hooks 116 of ratchet 106 of FIGS. 2A through 2J. On the other hand, hook 216b may be a rearward facing hook such that the mouth of hook 216b faces away from the tire tread of a vehicle 103 being restrained by system 200. Similar to hooks 216a, hook 216b is configured to lock onto a grate wire of grate panel 112. In certain embodiments, hooks 216a and hooks 216b may share a common square axle.

According to the illustrated embodiment, hooks 216a may be fixed hooks and hook 216b may be a rotating hook. In such an embodiment, hook 216b may be configured to lock hooks 216a onto grate wires of grate panel 112 when rotated to a locked position via a lever, such as lever 226, or other suitable mechanism. Lever 226 may be configured to prevent hook 216b from rotating or otherwise unlocking from a grate wire of grated panel 112 after being placed in the locked position. In certain embodiments, lever 226 may be used to unlock hook 216b from the grate wire (e.g., by rotating lever 226 upwards) and thereby disengage hooks 216a from grated panel 112.

Although particular examples of ratchet 206 and hooks 216 have been described, the present disclosure contemplates any suitable ratchet 206 and hooks 216 comprising any suitable components configured in any suitable manner, according to particular needs. In addition, any component of ratchet 206 may be separate from or integral to any other component of ratchet 206 and system 200.

Anchor 208 of the vehicle restraint assembly of system 200 may be configured to be coupled to one or more grate wires of grated panel 112 of deck 104. For example, anchor 208 may be coupled to grated panel 112 via one or more grate wires on a first side of a tire of vehicle 103. System 200 typically utilizes anchor 208 to secure one end of a strap 110 to deck 104 via grated panel 112.

An anchor 208 may include a body 232, hooks 234, mandrel 236, and lever 240. In general, body 232 and mandrel 236 are substantially similar to body 132 and mandrel 136 of system 100 described above with respect to FIGS. 1 through 2J. As illustrated in FIG. 3, anchor 208 of system 200 may include a first set of hooks, hooks 234a, and a second set of hooks, hooks 234b. Hooks 234a may be forward facing hooks and may be substantially similar to hooks 134 of anchor 108 of FIGS. 2A through 2J. On the other hand, hook 234b may be a rearward facing hook such that the mouth of hook 234b faces away from the tire tread of a vehicle 103 being restrained by system 200. Similar to hooks 234a, hook 234b is configured to lock onto a grate wire of grate panel 112. In certain embodiments, hooks 234a and hooks 234b may share a common square axle.

According to the illustrated embodiment, hooks 234a may be fixed hooks and hook 234b may be a rotating hook. In such an embodiment, hook 234b may be configured to lock hooks 234a onto grate wires of grate panel 112 when rotated to a locked position via a lever, such as lever 240, or other suitable mechanism. Lever 240 may be configured to prevent hook 234b from rotating or otherwise unlocking from a grate wire of grated panel 112 after being placed in the locked position. In certain embodiments, lever 240 may be used to unlock hook 234b from the grate wire (e.g., by rotating lever 240 upwards) and thereby disengage hooks 234a from grated panel 112.

Although particular examples of anchor 208 and hooks 234 have been described, the present disclosure contemplates any suitable anchor 208 and hooks 234 comprising any suitable components configured in any suitable manner, according to particular needs. In addition, any component of anchor 208 may be separate from or integral to any other component of anchor 208 and system 200.

Figure 4:
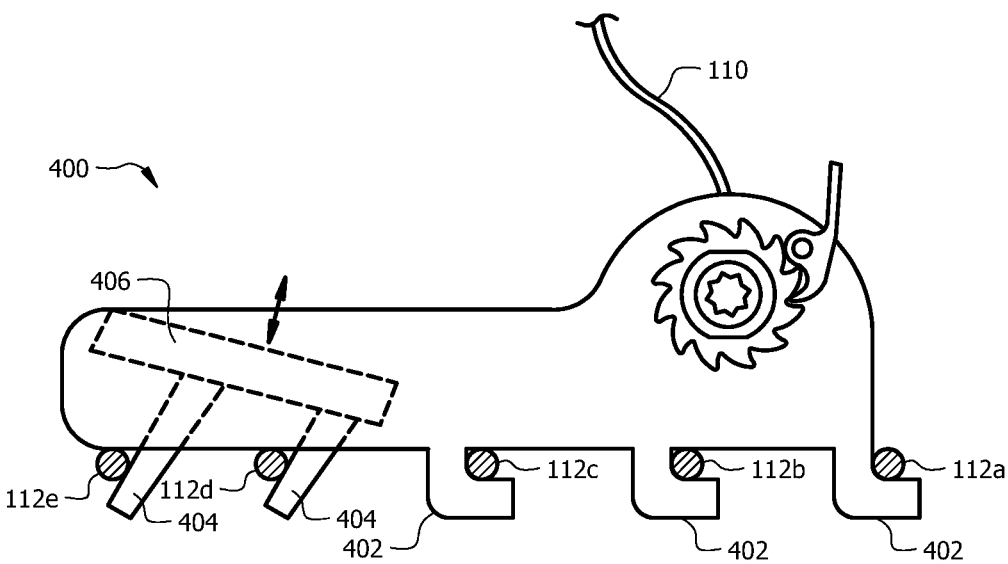
FIG. 4 illustrates a side view of an example ratchet of a system for restraining a vehicle in accordance with an embodiment of the present disclosure.

FIG. 4 illustrates a side view of an example ratchet of a system for restraining a vehicle in accordance with an embodiment of the present disclosure. Ratchet 400 may include substantially similar components configured in substantially the same manner as ratchet 106 of FIGS. 1 through 2J, except as described below.

Ratchet 400 includes fixed hooks 402 and moveable hooks 404. Fixed hooks 402 may be substantially similar to hooks 116 and hooks 134 described above with respect to FIGS. 1 through 2J. Moveable hooks 404 may refer to tapered teeth and may be configured to move up and down by a lever 406. For example, once fixed hooks 402 have engaged grate wires 112a, 112b, and 112c of grated panel 112, lever 406 may be pushed downward to lock moveable hooks 404 into position such that moveable hooks 404 capture grate wires 112d and 112e of grated panel 112. To disengage moveable hooks 404 from grate wires 112d and 112e, lever 406 may be pushed upward. In general, moveable hooks 404 prevent the back portion of ratchet 400 from lifting during use.

Although particular examples of ratchet 400 have been described, the present disclosure contemplates any suitable ratchet 400 comprising any suitable components configured in any suitable manner, according to particular needs. In addition, any component of ratchet 400 may be separate from or integral to any other component of ratchet 400. Furthermore, although the features of FIG. 4 have been described with respect to a ratchet 400, this disclosure contemplates implementing any number and combination of those features into an anchor, such as an anchor 108 of system 100. For example, fixed hooks 402, moveable hooks 404, and lever 406 may be incorporated into anchor 108 of system 100.

Figure 5:
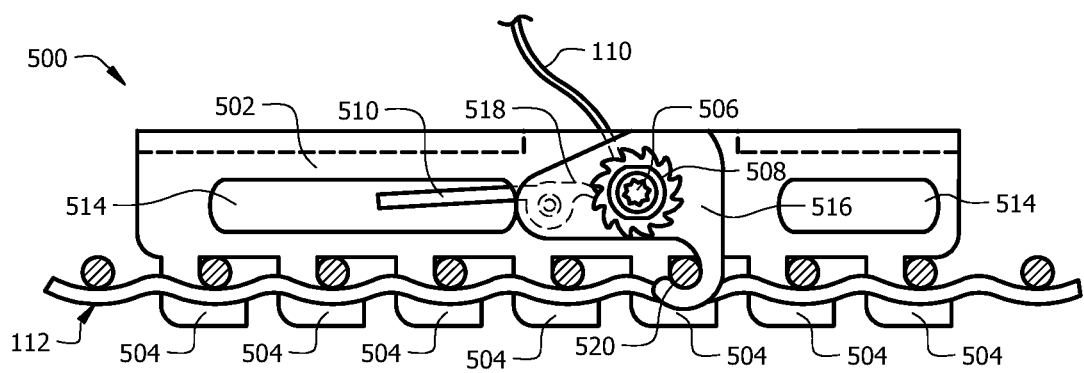
FIG. 5 illustrates a side view of an example ratchet of a system for restraining a vehicle in accordance with an embodiment of the present disclosure.

FIG. 5 illustrates a side view of an example ratchet of a system for restraining a vehicle in accordance with an embodiment of the present disclosure. Ratchet 500 may include substantially similar components configured in substantially the same manner as ratchet 106 of FIGS. 1 through 2J, except as described below.

Ratchet 500 generally includes a body 502, hooks 504, mandrel 506, ratchet wheel 508, release lever 510, and strap slot 512 (not shown). Hooks 504, mandrel 506, ratchet wheel 508, and release lever 510 may be coupled to or otherwise integrated with body 502. Body 502 may be substantially similar to body 114 of ratchet 106 described above and may be made from a light-weight engineered plastic, steel, and/or any other suitable material. Pivots, bearings, bushings, and/or fraying surfaces may be made from material that does not require lubrication. According to certain embodiments, a body 502 of ratchet 500 may be half the width of a traditional chock such that two bodies 502 may be stored in the same storage device used to store a single traditional chock.

In certain embodiments, lightening and/or access holes 514 may be formed in body 502. Lightening and/or access holes may be configured to provide clearance for operating release lever 510. In certain embodiments, body 502 includes steel inserts for reinforcement, hooks, mandrels, ratchet wheels, pawls, levers, axles, and/or fasteners. Additionally, or alternatively, a bottom of a body 502 may comprise molded squares that key into a grated panel 112 (e.g., between longitudinal and cross-car grate wires) and/or molded slots for horizontal and/or vertical grate wires of grate panel 112, thereby preventing horizontal and vertical movement when body 502 is secured to grated panel 112. Molded slots in a bottom surface of body 502 may each have a raised surface that pinches a respective grate wire to keep body 502 stationary when a strap 110 is being tightened around a tire of a vehicle 103. In certain embodiments, body 502 may comprise any suitable number and combination of mechanisms for locking body 502 to grated panel 112.

In general, ratchet 500 utilizes hooks 504 to engage a grated panel 112 of deck 104 via grate wires of grated panel 112. Hooks 504 of ratchet 500 may be substantially similar to hooks 116 of ratchet 106 and hooks 134 of anchor 108 described above with respect to FIGS. 1 through 2J. In certain embodiments, hooks 504 may be rearward-facing hooks. The present disclosure contemplates hooks 504 being forward-facing hooks, rearward-facing hooks, side-facing hooks, any other suitable hooks, and/or any combination of the preceding.

Mandrel 506 may be coupled to or otherwise integrated with body 502 of ratchet 500. For example, mandrel 506 may be mounted on a rotating clevis 516 (which also may be referred to as a pivoting latch) attached to body 502. As such, mandrel 506 may rotate up towards a tire of a vehicle 103 when a strap 110 is being tightened around a portion of the tire by ratchet 500 and rotate downwards when the strap force is released. In certain embodiments, mandrel 506 may be mounted to body 502 (and rotating clevis 516) such that mandrel 506 is located close to deck 104 when body 502 is secured to deck 104, thereby preventing contact with the inner fender wells of vehicle 103. Mandrel 506 may include a strap slot 512 and may be made from steel and/or any other suitable material.

Mandrel 506 may be configured to couple one end of a strap 110 to ratchet 500 via strap slot 512 and operable to rotate to tighten strap 110 around a tire of a vehicle 103. Release lever 510 of ratchet 500 may keep mandrel 506 from freewheeling when tension is applied during rotation. In certain embodiments, mandrel 506 may rotate freely when release lever 510 is decoupled from mandrel 506 (e.g., for strap removal). In such embodiments, mandrel 506 may be configured with low friction bushings to allow mandrel 506 to freewheel when not restrained. In general, mandrel 506 may facilitate increasing the tension of strap 110 of the vehicle restraint assembly on a tire of a vehicle, while release lever 510 may facilitate decreasing the tension of strap 110 on the tire of the vehicle.

A pawl 518 of release lever 510 may lock rotation of mandrel 506 via a ratchet wheel 508. As such, ratchet 500 (and mandrel 506) may not release the tightening force around a tire of a vehicle unless pawl 518 has been disengaged. In certain embodiments, pawl 518 may be configured such that a downward force rotates mandrel 506 and tightens strap 110. In certain embodiments, when pawl 518 is engaged with ratchet wheel 508, mandrel 506 may rotate freely in one direction. For example, pawl 518 may slip over the teeth of ratchet wheel 508 (even when engaged with the ratchet wheel 508) if mandrel 506 is rotated one direction. On the other hand, pawl 518 may lock mandrel 506 in place if mandrel 506 is rotated another direction. In certain embodiments, release lever 510 may be used to disengage pawl 518 from ratchet wheel 508, and thereby decrease the tension of strap 110 on the tire of the vehicle.

As illustrated in FIG. 5, rotating clevis 516 may include a forward-facing hook 520 configured to engage a grate wire of grated panel 112 when strap 110 is tightened around a tire of a vehicle 103. In such an embodiment, the tension in strap 110 will keep rotating clevis 516 and forward-facing hook 520 engaged. In certain embodiments, forward-facing hook 520 may interlock with a rearward-facing hook 504 such that a grate wire of grate panel 112 is trapped between the two hooks. In certain embodiments, a spring may be used to keep rotating clevis 516 and forward-facing hook 520 in an unlocked position, thereby allowing body 502 to be secured to grated panel 112 via hooks 504 prior to tightening strap 110. According to the present disclosure, hook 520 may be a forward-facing hook, rearward-facing hook, side-facing hook, any other suitable hook, and/or any combination of the preceding.

Although particular examples of ratchet 500 have been described, the present disclosure contemplates any suitable ratchet 500 comprising any suitable components configured in any suitable manner, according to particular needs. In addition, any component of ratchet 500 may be separate from or integral to any other component of ratchet 500. Furthermore, although the features of FIG. 5 have been described with respect to a ratchet 500, this disclosure contemplates implementing any number and combination of those features into an anchor, such as an anchor 108 of system 100.

Figure 6:
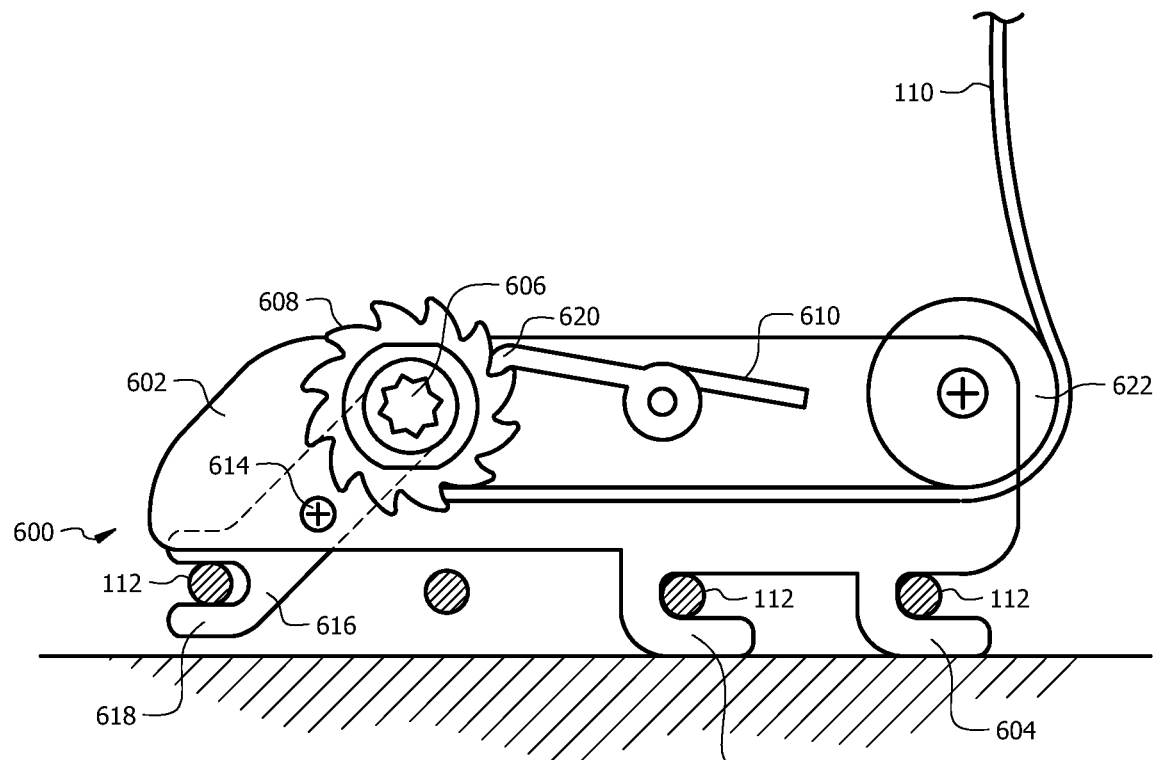
FIG. 6 illustrates a side view of an example ratchet of a system for restraining a vehicle in accordance with an embodiment of the present disclosure.
Figure 7A:
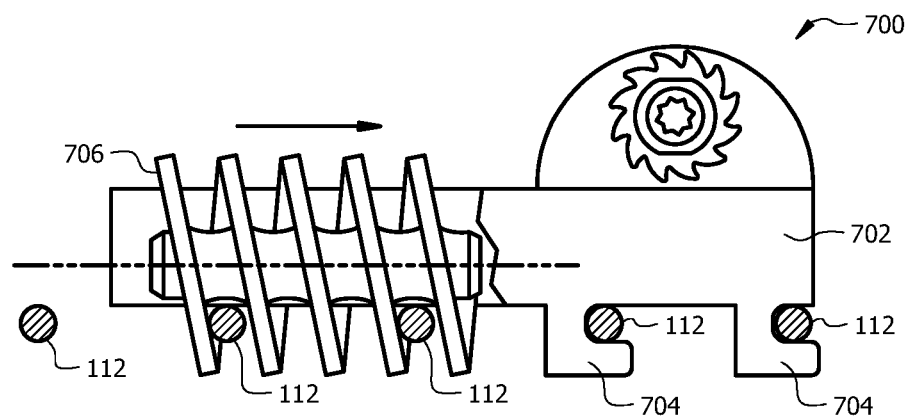
FIGS. 7A through 7D illustrate plan, end, and side views of an example ratchet of a system for restraining a vehicle in accordance with an embodiment of the present disclosure.
Figure 7B:
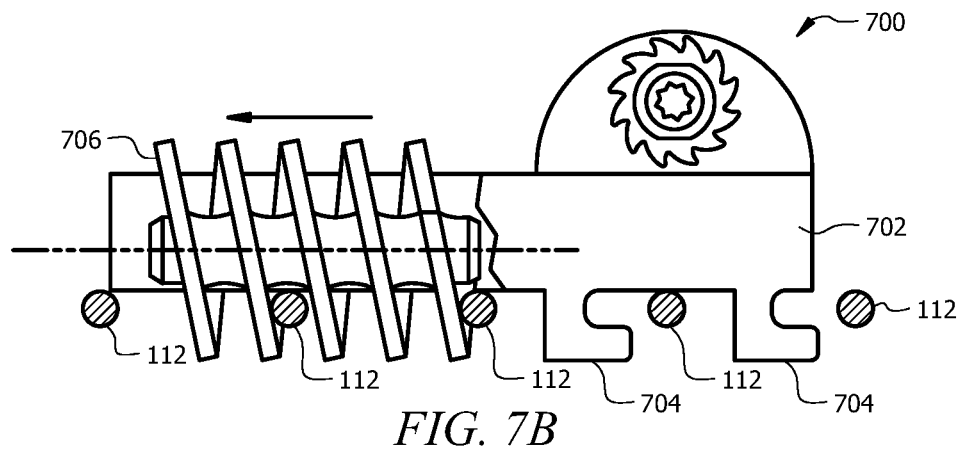
Figure 7C:
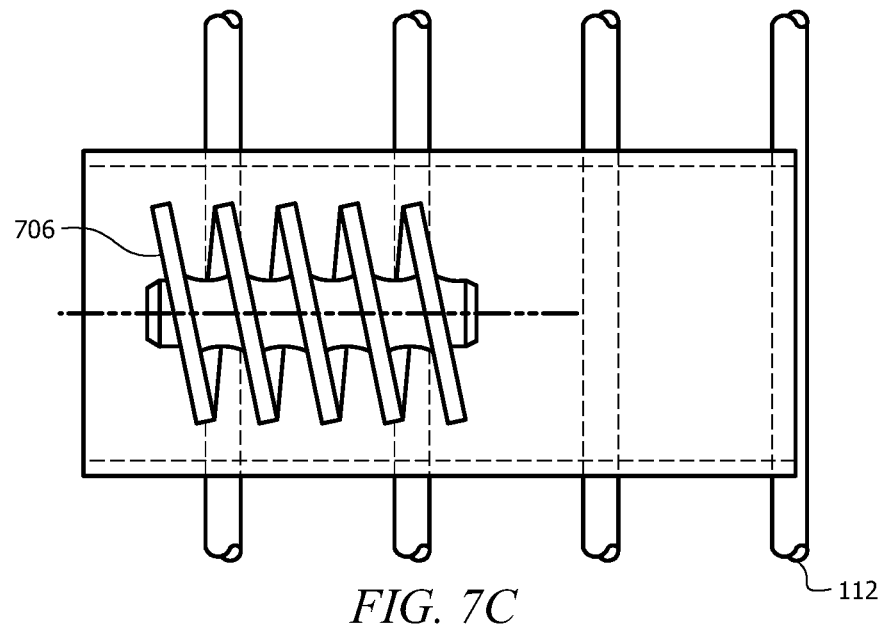
Figure 7D:
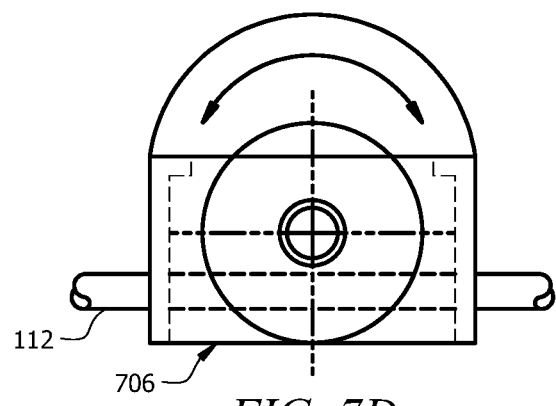

FIG. 6 illustrates a side view of an example ratchet of a system for restraining a vehicle in accordance with an embodiment of the present disclosure. Ratchet 600 may include substantially similar components configured in substantially the same manner as ratchet 106 of FIGS. 1 through 2J, ratchet 206 of FIG. 3, ratchet 400 of FIG. 4, and/or ratchet 500 of FIG. 5, except as described below.

Ratchet 600 generally includes a body 602, hooks 604, mandrel 606, ratchet wheel 608, release lever 610, strap slot 612 (not shown), and pivoting lock 616. Hooks 604 may be coupled to or otherwise integrated with body 602. According to the illustrated embodiment, mandrel 606, ratchet wheel 608, release lever 610, and pivoting lock 616 may be coupled to body 602 by a pivot 614. In certain embodiments, ratchet 600 may include a pulley 622 used to facilitate tightening a strap 110 around a tire of a vehicle 103. Pulley 622 may be configured to direct the force from a strap 110 to pull on a pivoting lock 616 (described in more detail below) such that tension in strap 110 keeps pivoting lock 616 engage with a grate panel 112.

Body 602 may be substantially similar to body 114 of ratchet 106 and/or any other ratchet body described above and may be made from a light-weight engineered plastic, steel, and/or any other suitable material. Pivots, bearings, bushings, and/or fraying surfaces may be made from material that does not require lubrication. According to certain embodiments, a body 602 of ratchet 600 may be half the width of a traditional chock such that two bodies 602 may be stored in the same storage device used to store a single traditional chock.

In certain embodiments, body 602 includes steel inserts for reinforcement, hooks, mandrels, ratchet wheels, pawls, levers, axles, and/or fasteners. Additionally, or alternatively, a bottom of a body 602 may comprise molded squares that key into a grated panel 112 (e.g., between longitudinal and cross-car grate wires) and/or molded slots for horizontal and/or vertical grate wires of grate panel 112, thereby preventing horizontal and vertical movement when body 602 is secured to grated panel 112. Molded slots in a bottom surface of body 602 may each have a raised surface that pinches a respective grate wire to keep body 602 stationary when a strap 110 is being tightened around a tire of a vehicle 103. In certain embodiments, body 602 may comprise any suitable number and combination of mechanisms for locking body 602 to grated panel 112.

In general, ratchet 600 utilizes hooks 604 to engage a grated panel 112 of deck 104 via grate wires of grated panel 112. Hooks 604 of ratchet 600 may be substantially similar to hooks 116 of ratchet 106 and hooks 134 of anchor 108 described above with respect to FIGS. 1 through 2J. The present disclosure contemplates hooks 604 having any suitable shape or configuration. For example, hooks 604 may be forward-facing hooks, rearward-facing hooks, side-facing hooks, any other suitable hooks, and/or any combination of the preceding.

Mandrel 606, ratchet wheel 608, and release lever 610 may be coupled to or otherwise integrated with pivoting lock 616 of ratchet 600. According to the illustrated embodiment, mandrel 606 is mounted on a pivot lock 616 of body 602 and shares a common axis with a pivoting lock 616 comprising a rearward facing hook 618. As such, mandrel 606 and pivoting lock 616 may rotate clockwise when a strap 110 is being tightened around a portion of a tire of a vehicle by ratchet 600 and rotate counterclockwise when the strap force is released. In certain embodiments, mandrel 606 may be mounted to pivoting lock 616 such that mandrel 606 is located close to deck 104 when body 602 is secured to deck 104, thereby preventing contact with the inner fender wells of vehicle 103. Mandrel 606 may include a strap slot 612 (not shown) and may be made of steel and/or any other suitable material.

Mandrel 606 may be configured to couple one end of a strap 110 to ratchet 600 via strap slot 612 and operable to rotate to tighten strap 110 around a tire of a vehicle 103. Release lever 610 of ratchet 500 may keep mandrel 606 from freewheeling when tension is applied during rotation. In certain embodiments, mandrel 606 may rotate freely when release lever 610 is decoupled from mandrel 606 (e.g., for strap removal). In such embodiments, mandrel 606 may be configured with low friction bushings to allow mandrel 606 to freewheel when not restrained. In general, mandrel 606 may facilitate increasing the tension of strap 110 of the vehicle restraint assembly on a tire of a vehicle, while release lever 610 may facilitate decreasing the tension of strap 110 on the tire of the vehicle.

A pawl 620 of release lever 610 may lock rotation of mandrel 606 via a ratchet wheel 608. As such, ratchet 600 (and mandrel 606) may not release the tightening force around a tire of a vehicle unless pawl 620 has been disengaged. In certain embodiments, when pawl 620 is engaged with ratchet wheel 608, mandrel 606 may rotate freely in one direction. For example, pawl 620 may slip over the teeth of ratchet wheel 608 (even when engaged with the ratchet wheel 608) if mandrel 606 is rotated one direction. On the other hand, pawl 620 may lock mandrel 606 in place if mandrel 606 is rotated another direction. In certain embodiments, release lever 610 may be used to disengage pawl 620 from ratchet wheel 608, and thereby decrease the tension of strap 110 on the tire of the vehicle.

As explained above, pivoting lock 616 may include a rearward facing hook 618 and may be configured to rotate in a clockwise direction to engage a grate wire of grated panel 112 when strap 110 is tightened around a tire of a vehicle 103. In such an embodiment, the tension from strap 110 on mandrel 606 and the engagement of pawl 620 with ratchet wheel 608 keeps pivoting lock 616 and rearward facing hook 618 engaged and pushes body 602 of ratchet 600 forward (e.g., to the right in FIG. 6), thereby keeping hooks 604 engaged with grate wires of grated panel 112. In certain embodiments, rearward facing hook 618 may interlock with a forward-facing hook 604 such that a grate wire of grate panel 112 is trapped between the two hooks. In certain embodiments, a spring may be used to keep pivoting lock 616 and rearward facing hook 618 in an unlocked position, thereby allowing body 602 to be secured to grated panel 112 via hooks 604 prior to tightening strap 110.

Although particular examples of ratchet 600 have been described, the present disclosure contemplates any suitable ratchet 600 comprising any suitable components configured in any suitable manner, according to particular needs. In addition, any component of ratchet 600 may be separate from or integral to any other component of ratchet 600. Furthermore, although the features of FIG. 6 have been described with respect to a ratchet 600, this disclosure contemplates implementing any number and combination of those features into an anchor, such as an anchor 108 of system 100.

FIGS. 7A through 7D illustrate plan, end, and side views of an example ratchet of a system for restraining a vehicle in accordance with an embodiment of the present disclosure. Ratchet 700 may include substantially similar components configured in substantially the same manner as ratchet 106, ratchet 206, ratchet 400, ratchet 500, and/or ratchet 600, except as described below. For example, ratchet 700 may include a mandrel, ratchet wheel, release lever, pawl, and strap slot substantially similar to those of ratchet 106, ratchet 206, ratchet 400, ratchet 500, and/or ratchet 600.

According to the illustrated embodiment, ratchet 700 may include a body 702, hooks 704, and a worm lock gear 706. Hooks 704 and worm lock sear 706 may be coupled to or otherwise integrated with body 702. Other than being coupled to a worm lock gear 706, body 702 may be substantially similar to body 114 of ratchet 106 and/or any other ratchet body described herein.

In general, ratchet 700 utilizes hooks 704 to engage a grated panel 112 of deck 104 via grate wires of grated panel 112. Hooks 704 of ratchet 700 may be substantially similar to hooks 116 of ratchet 106 and hooks 134 of anchor 108 described above with respect to FIGS. 1 through 2J. The present disclosure contemplates hooks 704 having any suitable shape or configuration. For example, hooks 704 may be forward-facing hooks, rearward-facing hooks, side-facing hooks, any other suitable hooks, and/or any combination of the preceding.

A worm lock gear 706 may facilitate securing ratchet 700 to grated panel 112. Worm lock gear 706 may include teeth configured to capture one or more grate wires of grated panel 112 when rotated into a locked position (e.g., by rotating worm lock gear 706 clockwise). Rotating worm lock gear 706 clockwise may move ratchet 700 forward such that hooks 704 of ratchet 700 lock onto one or more grate wires of grated panel 112. In certain embodiments, ratchet 700 may be released from grated panel 112 when worm lock gear 706 is rotated into an unlocked position (e.g., by rotating worm lock gear 706 counterclockwise).

Although particular examples of ratchet 700 have been described, the present disclosure contemplates any suitable ratchet 700 comprising any suitable components configured in any suitable manner, according to particular needs. In addition, any component of ratchet 700 may be separate from or integral to any other component of ratchet 700. Furthermore, although the features of FIGS. 7A through 7B have been described with respect to a ratchet 700, this disclosure contemplates implementing any number and combination of those features into an anchor, such as an anchor 108 of system 100.

Figure 8A:
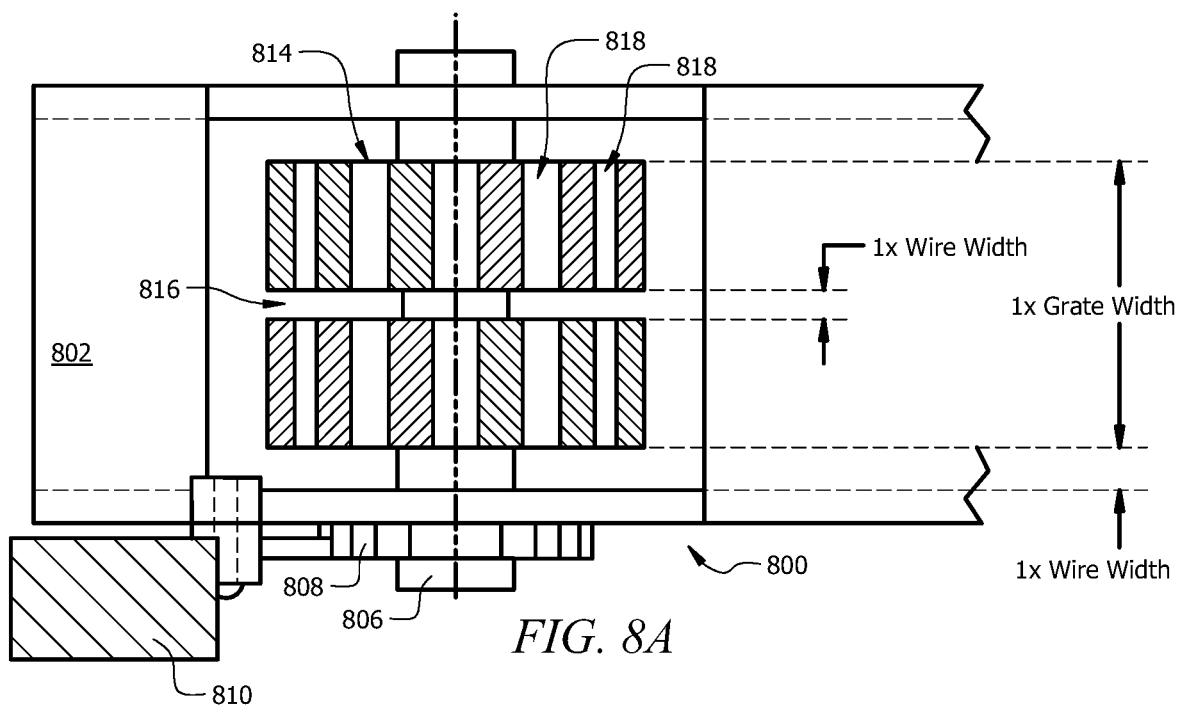
FIGS. 8A through 8B illustrate a plan view and side view, respectively, of an example ratchet of a system for restraining a vehicle in accordance with an embodiment of the present disclosure.
Figure 8B:
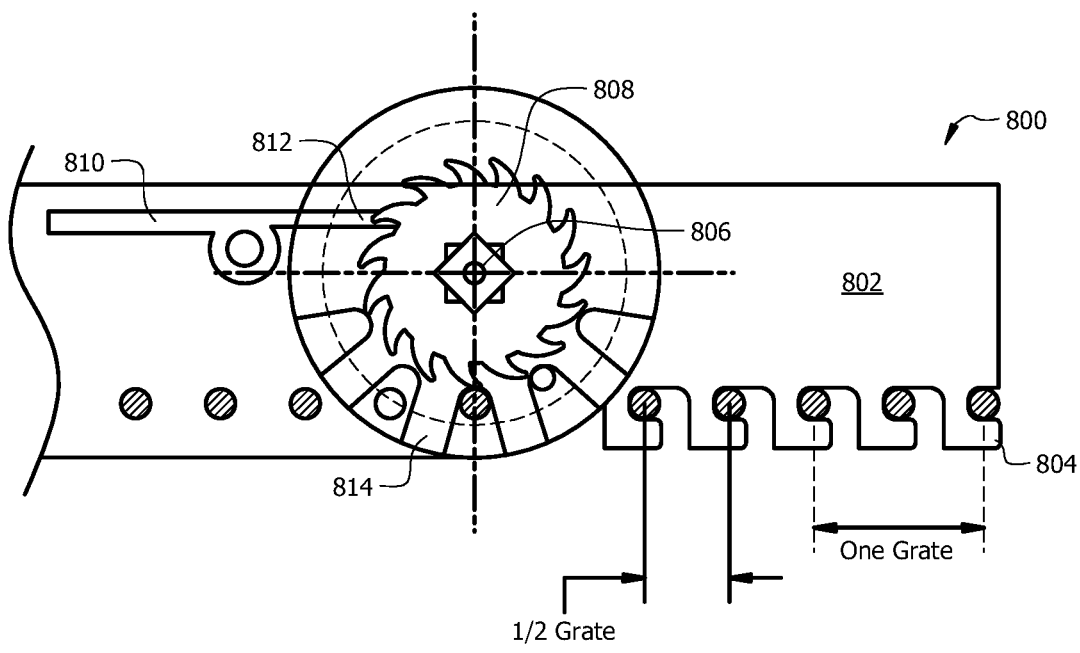

FIGS. 8A through 8B illustrate a plan view and side view, respectively, of an example ratchet of a system for restraining a vehicle in accordance with an embodiment of the present disclosure. Ratchet 800 may include substantially similar components configured in substantially the same manner as ratchet 106, ratchet 206, ratchet 400, ratchet 500, ratchet 600, and/or ratchet 700 except as described below.

According to the illustrated embodiment, ratchet 800 may include a body 802, hooks 804, mandrel 806, ratchet wheel 808, release lever 810, pawl 812, and pinion lock 814. Hooks 804, mandrel 806, ratchet wheel 808, release lever 810, pawl 812, and pinion lock 814 may be coupled to or otherwise integrated with body 802. Other than being coupled to a pinion lock 814, body 802 may be substantially similar to body 114 of ratchet 106 and/or any other ratchet body described herein.

In general, ratchet 800 utilizes hooks 804 to engage a grated panel 112 of deck 104 via grate wires of grated panel 112. Hooks 804 of ratchet 800 may be substantially similar to hooks 116 of ratchet 106 and hooks 134 of anchor 108 described above with respect to FIGS. 1 through 2J. The present disclosure contemplates hooks 804 having any suitable shape or configuration. For example, hooks 804 may be forward-facing hooks, rearward-facing hooks, side-facing hooks, any other suitable hooks, and/or any combination of the preceding.

Mandrel 806 may be coupled to a pinion lock 814 that rotates along a common axis. Mandrel 806 may include a strap slot (e.g., a strap slot 128 of FIGS. 2A through 2J) and may be made of steel and/or any other suitable material. Mandrel 806 may be substantially similar to mandrel 118 of ratchet 106 and/or any other ratchet mandrel described herein.

Mandrel 806 may be configured to couple one end of a strap 110 to ratchet 800 via a strap slot and operable to rotate to tighten a strap 110 around a tire of a vehicle. Release lever 810 of ratchet 800 may keep mandrel 806 from freewheeling when tension is applied during rotation. In certain embodiments, mandrel 806 may rotate freely when release lever 810 is decoupled from mandrel 806 (e.g., for strap removal). In such embodiments, mandrel 806 may be configured with low friction bushings to allow mandrel 806 to freewheel when not restrained. In general, mandrel 806 may facilitate increasing the tension of strap 110 of the vehicle restraint assembly on a tire of a vehicle, while release lever 810 may facilitate decreasing the tension of strap 110 on the tire of the vehicle.

A pawl 812 of release lever 810 may lock rotation of mandrel 806 via a ratchet wheel 808. As such, ratchet 800 (and mandrel 806) may not release the tightening force around a tire of a vehicle unless pawl 812 has been disengaged. In certain embodiments, pawl 812 may be configured such that a downward force rotates mandrel 806 and tightens strap 110. In certain embodiments, when pawl 812 is engaged with ratchet wheel 808, mandrel 806 may rotate freely in one direction. For example, pawl 812 may slip over the teeth of ratchet wheel 808 (even when engaged with the ratchet wheel 808) if mandrel 806 is rotated one direction. On the other hand, pawl 812 may lock mandrel 806 in place if mandrel 806 is rotated another direction. In certain embodiments, release lever 810 may be used to disengage pawl 812 from ratchet wheel 808, and thereby decrease the tension of strap 110 on the tire of the vehicle.

Ratchet 800 may further include a pinion lock 814 that rotates along the same axis of mandrel 806. In particular, pinion lock 814 may be operable to rotate to lock ratchet 800 in place when mandrel 806 is rotated to tighten strap 110. The rotation of pinion lock 814 causes pinion teeth to engage one or more grate wires of grated panel 112 and forces hooks 804 of ratchet 800 to move forward and lock onto one or more grate wires of grated panel 112. In general, pinion lock 814 is configured to prevent hooks 804 from disengaging from grated panel 112 when in the locked position. In certain embodiments, pinion lock 814 may be unlocked when pawl 812 is disengaged from ratchet wheel 808 by release lever 810.

In certain embodiments, pinion lock 814 may include a vertical molded slot 816 that allows at least a portion of pinion lock 814 to extend down and around at least a portion of a vertical grate wire of grated panel 112 to help stabilize ratchet 800 during rotation of pinion lock 814. The width of a vertical molded slot 816 may be approximately the same as a width of a grate wire of grated panel 112. In certain embodiments, pinion lock 814 may include horizontal molded slots 818. Each horizontal molded slot 818 may be configured to allow at least a portion of pinion lock 814 to extend down and around at least a portion of a horizontal grate wire of grated panel 112 to help stabilize ratchet 800 during rotation of pinion lock 814. The width of a vertical molded slot 816 may be approximately the same as a width between grate wires of grated panel 112.

Although particular examples of ratchet 800 have been described, the present disclosure contemplates any suitable ratchet 800 comprising any suitable components configured in any suitable manner, according to particular needs. In addition, any component of ratchet 800 may be separate from or integral to any other component of ratchet 800. Furthermore, although the features of FIGS. 8A through 8B have been described with respect to a ratchet 800, this disclosure contemplates implementing any number and combination of those features into an anchor, such as an anchor 108 of system 100.

Figure 9A:
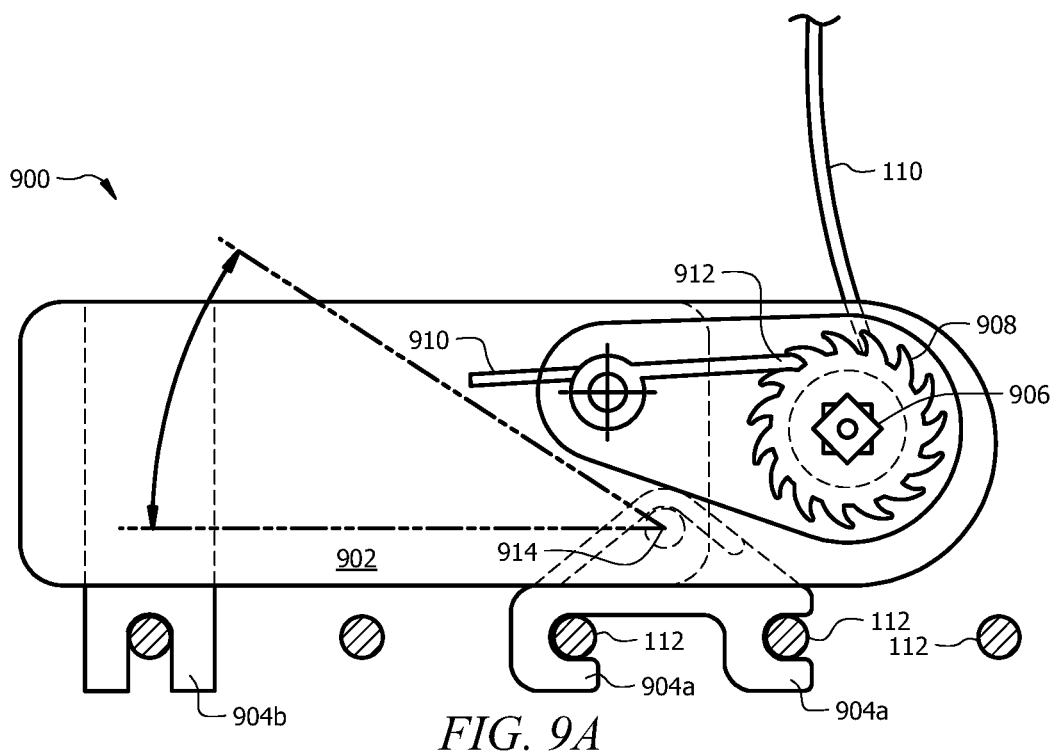
FIGS. 9A through 9B illustrate a side view and an end view, respectively, of an example ratchet of a system for restraining a vehicle in accordance with an embodiment of the present disclosure.
Figure 9B:
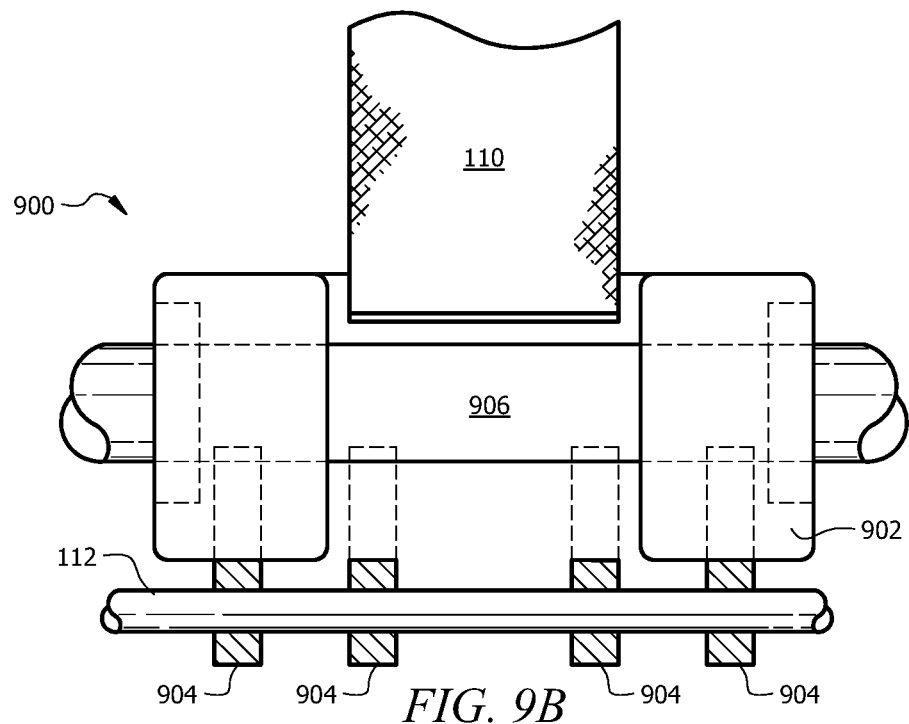

FIGS. 9A through 9B illustrate a side view and an end view, respectively, of an example ratchet of a system for restraining a vehicle in accordance with an embodiment of the present disclosure. Ratchet 900 may refer to ratchet with an end-mounted mandrel and recessed pawl and ratchet and may include substantially similar components configured in substantially the same manner as ratchet 106, ratchet 206, ratchet 400, ratchet 500, ratchet 600, ratchet 700, and/or ratchet 800, except as described below.

According to the illustrated embodiment, ratchet 900 may include a body 902, hooks 904, mandrel 906, ratchet wheel 908, release lever 910, and pawl 912. Hooks 904, mandrel 906, ratchet wheel 908, release lever 910, and pawl 912 may be coupled to or otherwise integrated with body 902. Body 902 may be substantially similar to body 114 of ratchet 106 and/or any other ratchet body described herein. In certain embodiments, body 902 may include a recess for housing mandrel 906 and/or ratchet wheel 908.

Hooks 904a and hooks 904b generally facilitate securing ratchet 900 to a grated panel 112 of deck 104 via grate wires of grated panel 112. Hooks 904a may be forward facing hooks (similar to hooks 116 of ratchet 106), while hooks 904b may be rear-inverted U-shaped hooks. Alternatively, hooks 904a may be rearward facing hooks. Hooks 904a and 904b may be made from steel and/or any other suitable material and may be configured to trap a grate wire of a grated panel 112. The present disclosure contemplates hooks 904a and 904b having any suitable shape or configuration. For example, hooks 904a and/or 904b may be forward-facing hooks, rearward-facing hooks, side-facing hooks, U-shaped hooks, P-shaped hooks, T-shaped hooks, any other suitable hooks, and/or any combination of the preceding.

As illustrated in FIG. 9A, hooks 904a may be coupled to a pivot 914 of body 902. By coupling hooks 904a to pivot 914, body 902 may rotate about a common horizontal pivot point between mandrel 906 and U-shaped hook 904b, thereby creating a fulcrum. In such an embodiment, when strap 110 is tightened around a tire of a vehicle 103, an upward force rotates body 902 upwards at the mandrel end (the right side of body 902 in FIG. 9A) and downwards at the other end (the left side of body 902 in FIG. 9A) to engage and lock inverted U-shaped hook 904b onto a grate wire of grated panel 112 and prevent ratchet 900 from moving forwards or backwards. In certain embodiments, pivot 914 may include a torsional spring for rotating body 902.

Although particular examples of ratchet 900 and hooks 904 have been described, the present disclosure contemplates any suitable ratchets 900 and hooks 904 comprising any suitable components configured in any suitable manner, according to particular needs. In addition, any component of ratchet 900 may be separate from or integral to any other component of ratchet 900. Furthermore, although the features of FIGS. 9A through 9B have been described with respect to a ratchet 900, this disclosure contemplates implementing any number and combination of those features into an anchor, such as an anchor 108 of system 100.

Figure 10A:
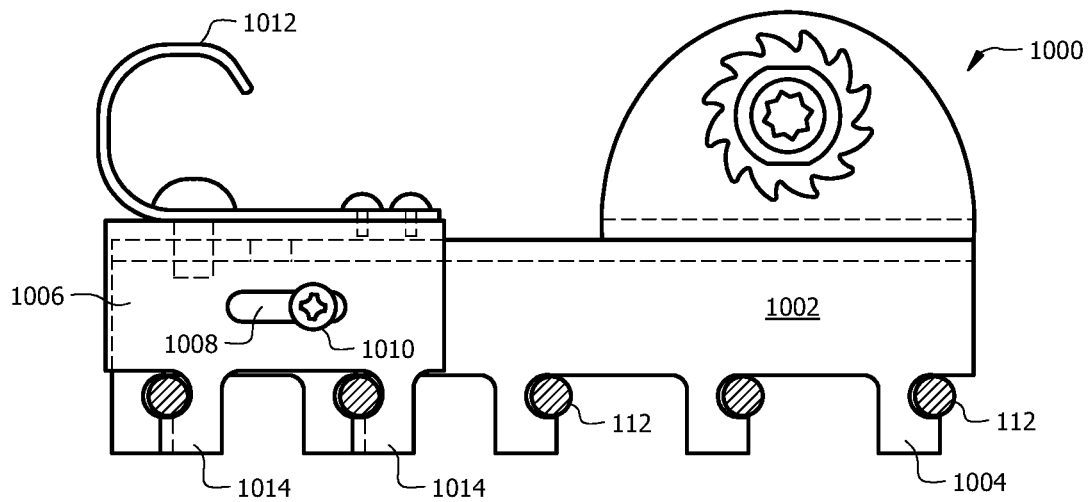
FIGS. 10A through 10C illustrate side views of an example ratchet of a system for restraining a vehicle in accordance with an embodiment of the present disclosure.
Figure 10B:
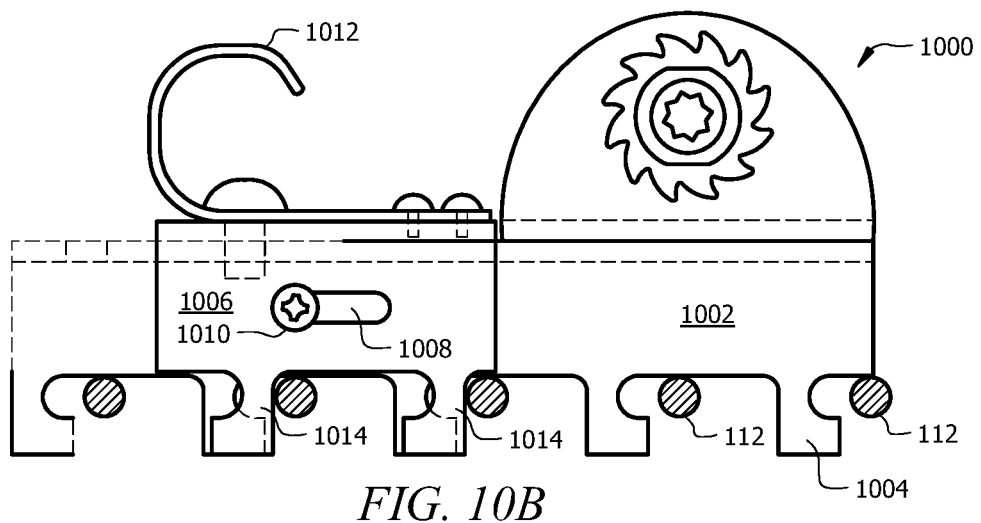
Figure 10C:
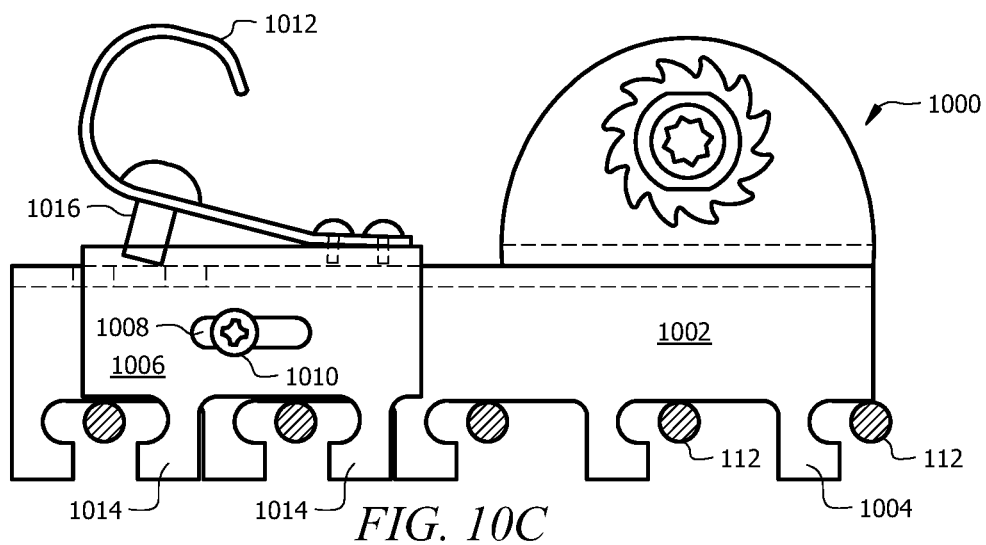

FIGS. 10A through 10C illustrate side views of an example ratchet of a system for restraining a vehicle in accordance with an embodiment of the present disclosure. Ratchet 1000 may include substantially similar components configured in substantially the same manner as one or more ratchets described above with respect to FIGS. 1 through 9B. For example, ratchet 1000 may include a mandrel, ratchet wheel, release lever, pawl, and strap slot substantially similar to those of ratchet 106, ratchet 206, ratchet 400, ratchet 500, ratchet 600, ratchet 700, ratchet 800, and/or ratchet 900.

According to the illustrated embodiment, ratchet 1000 may include a body 1002, hooks 1004, and a sliding lock 1006. Hooks 1004 and sliding lock 1006 may be coupled to or otherwise integrated with body 1002. Body 1002 may be a stamped body and may be substantially similar to body 114 of ratchet 106 and/or any other ratchet body described herein. In certain embodiments, a slot 1008 for a fastener 1010 may be formed in body 1002.

In general, ratchet 1000 utilizes hooks 1004 to engage a grated panel 112 of deck 104 via grate wires of grated panel 112. Hooks 1004 of ratchet 1000 may be substantially similar to hooks 116 of ratchet 106 and hooks 134 of anchor 108 described above with respect to FIGS. 1 through 2J. The present disclosure contemplates hooks 1004 having any suitable shape or configuration. For example, hooks 1004 may be forward-facing hooks, rearward-facing hooks, side-facing hooks, any other suitable hooks, and/or any combination of the preceding.

A sliding lock 1006 may facilitate securing ratchet 1000 to grated panel 112. Sliding lock 1006 may be configured to slide back and forth along at least a portion of body 1002. In certain embodiments, sliding lock 1006 may include hooks, such as rearward facing hooks 1014 and/or any other suitable hooks. As illustrated in FIG. 10A, each hook 1014 may be configured to interlock with a respective hook 1004 when sliding lock 1006 is moved into a locked position such that a grate wire of grated panel 112 may be trapped between the two hooks.

In certain embodiments, sliding lock 1006 may be coupled to body 1002 by a fastener 1010. In such embodiments, sliding look 1006 may be able to slide back and forth along body 1002 pursuant to the length of slot 1008. In certain embodiments, fastener 1010 may be an over-sized mushroom head fastener or any other suitable type of fastener.

A handle 1012 may be coupled to sliding lock 1006 and may be used to facilitate moving sliding lock 1006. Handle 1012 may be a flexible handle or any other suitable handle. In certain embodiments, handle 1012 may include a pin 1016 extending out of a bottom surface of handle 1012 and configured to engage body 1002 via an opening formed in body 1002. In general, a pin 1016 of handle 1012 is configured to secure sliding lock 1006 in a locked position. As illustrated in FIGS. 10B and 10C, sliding lock 1006 may be unlocked my lifting handle 1012 upwards and pulling sliding lock 1006 out of the locked position.

Although particular examples of ratchet 1000 have been described, the present disclosure contemplates any suitable ratchet 1000 comprising any suitable components configured in any suitable manner, according to particular needs. In addition, any component of ratchet 1000 may be separate from or integral to any other component of ratchet 1000. Furthermore, although the features of FIGS. 10A through 10C have been described with respect to a ratchet 1000, this disclosure contemplates implementing any number and combination of those features into an anchor, such as an anchor 108 of system 100.

FIGS. 11A through 11D illustrate plan and side views of an example ratchet of a system for restraining a vehicle in accordance with an embodiment of the present disclosure. Ratchet 1100 may include substantially similar components configured in substantially the same manner as one or more ratchets described above with respect to FIGS. 1 through 10C. For example, ratchet 1100 may include a mandrel, ratchet wheel, release lever, pawl, and strap slot substantially similar to those of ratchet 106, ratchet 206, ratchet 400, ratchet 500, ratchet 600, ratchet 700, ratchet 800, ratchet 900, and/or ratchet 1000.

According to the illustrated embodiment, ratchet 1100 may include a body 1102, hooks 1104, and a sliding lock 1106. Hooks 1104 and sliding lock 1106 may be coupled to or otherwise integrated with body 1102. Body 1102 may be a stamped body and may be substantially similar to body 114 of ratchet 106, body 1002 of ratchet 1000, and/or any other ratchet body described herein. In certain embodiments, a slot 1108 for a fastener 1110 may be formed in body 1102.

In general, ratchet 1100 utilizes hooks 1104 to engage a grated panel 112 of deck 104 via grate wires of grated panel 112. Hooks 1104 of ratchet 1100 may be substantially similar to hooks 116 of ratchet 106 and hooks 134 of anchor 108 described above with respect to FIGS. 1 through 2J. The present disclosure contemplates hooks 1104 having any suitable shape or configuration. For example, hooks 1104 may be forward-facing hooks, rearward-facing hooks, side-facing hooks, any other suitable hooks, and/or any combination of the preceding.

Figure 11A:
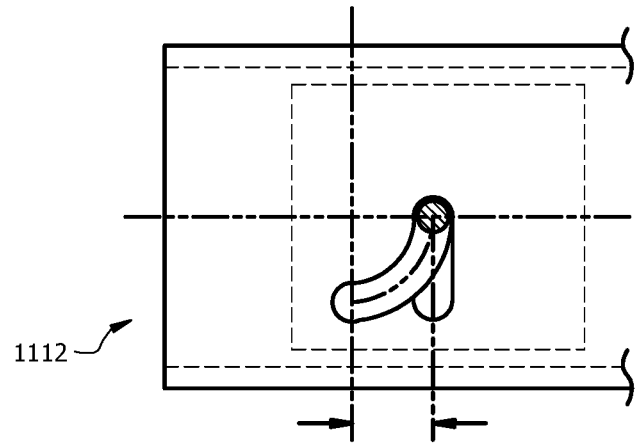
FIGS. 11A through 11D illustrate plan and side views of an example ratchet of a system for restraining a vehicle in accordance with an embodiment of the present disclosure.
Figure 11B:
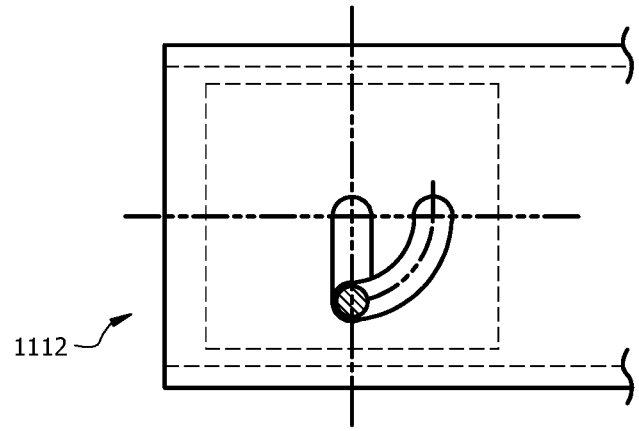
Figure 11C:
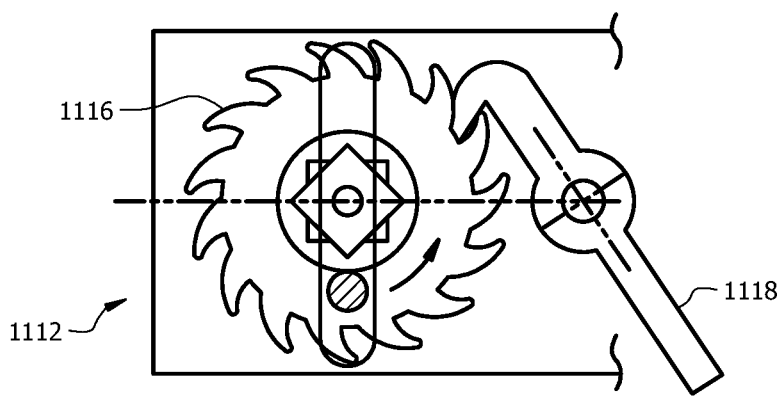
Figure 11D:
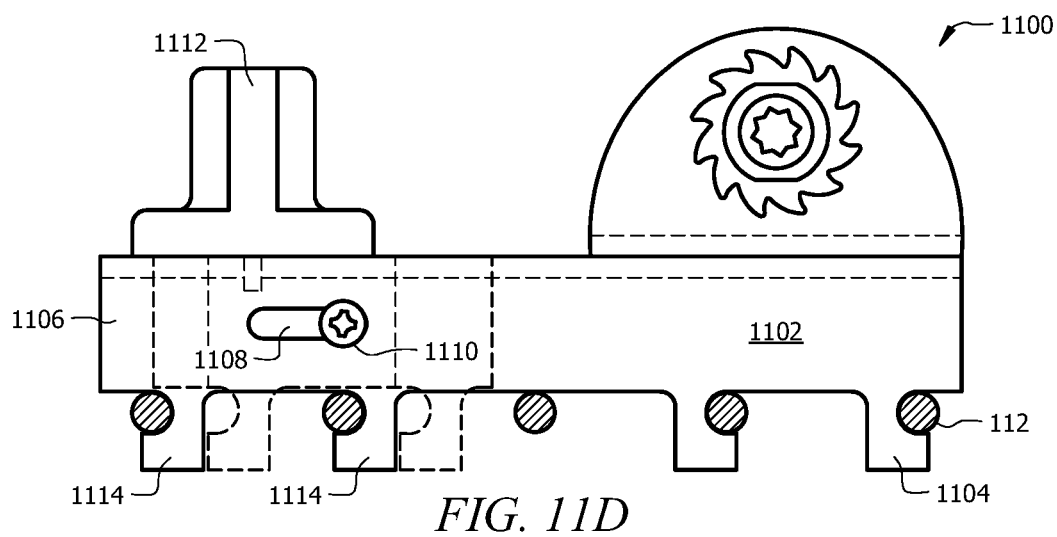

A sliding lock 1106 may facilitate securing ratchet 1100 to grated panel 112. Sliding lock 1106 may be configured to slide back and forth along at least a portion of body 1102. In certain embodiments, sliding lock 1106 may include hooks, such as rearward facing hooks 1114. As illustrated in FIG. 11D, each hook 1114 may be configured to lock onto a grate wire of grated panel 112 when sliding lock 1106 is moved into a locked position. In certain embodiments, hooks 1114 may be approximately twice a width of a grate wire of grated panel 112.

In certain embodiments, sliding lock 1106 may be coupled to body 1102 by a fastener 1110. In such embodiments, sliding look 1106 may be able to slide back and forth along body 1102 pursuant to the length of slot 1108. In certain embodiments, fastener 1110 may be an over-sized mushroom head fastener or any other suitable type of fastener.

A knob 1112 may be coupled to sliding lock 1106 and may be used to lock sliding lock 1106 into place. As shown in FIG. 11C, knob 1112 may include a ratchet wrench 1116 operable to rotate ninety degrees by turning knob 1112 to lock and unlock sliding lock 1106. A torsion spring latch 1118 may prevent ratchet wrench 1116 from rotating when in a locked or unlocked position. In general, knob 1112 is configured to secure sliding lock 1106 in a locked position (as shown in FIG. 11B) or an unlocked position (as shown in FIG. 11A).

Although particular examples of ratchet 1100 have been described, the present disclosure contemplates any suitable ratchet 1100 comprising any suitable components configured in any suitable manner, according to particular needs. In addition, any component of ratchet 1100 may be separate from or integral to any other component of ratchet 1100. Furthermore, although the features of FIGS. 11A through 11D have been described with respect to a ratchet 1100, this disclosure contemplates implementing any number and combination of those features into an anchor, such as an anchor 108 of system 100.

Figure 12:
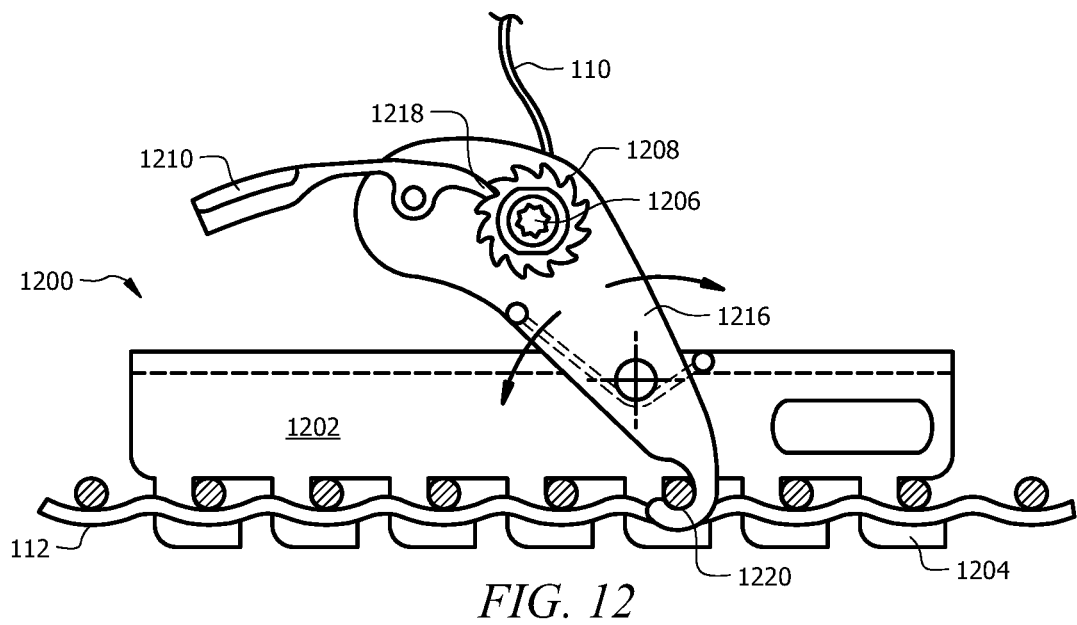
FIGS. 12 and 13 illustrate a side view and cross-section view, respectively, of an example ratchet of a system for restraining a vehicle in accordance with an embodiment of the present disclosure.
Figure 13:
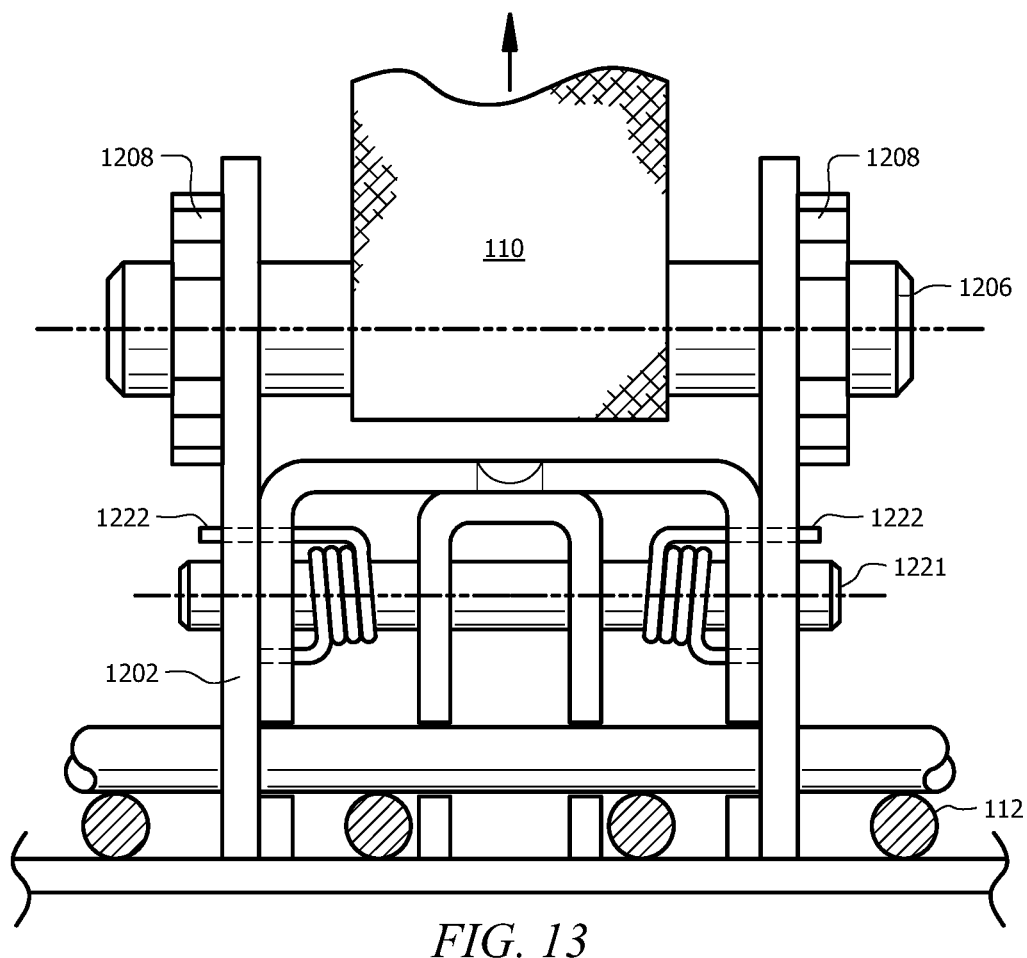

FIGS. 12 and 13 illustrate a side view and cross-section view, respectively, of an example ratchet of a system for restraining a vehicle in accordance with an embodiment of the present disclosure. Ratchet 1200 may include substantially similar components configured in substantially the same manner as ratchet 500 of FIG. 5 and/or any other ratchet described herein.

Ratchet 1200 generally includes a body 1202, hooks 1204, mandrel 1206, ratchet wheel 1208, release lever 1210, and strap slot 1212 (not shown). Hooks 1204, mandrel 1206, ratchet wheel 1208, and release lever 1210 may be coupled to or otherwise integrated with body 1202. Body 1202 may be substantially similar to body 114 of ratchet 106 and/or body 502 of ratchet 500 described above and may be made from a light-weight engineered plastic, steel, and/or any other suitable material. In certain embodiments, body 1202 may be a stamped galvanized steel body. Pivots, bearings, bushings, and/or fraying surfaces may be made from material that does not require lubrication. According to certain embodiments, a body 1202 of ratchet 1200 may be half the width of a traditional chock such that two bodies 1202 may be stored in the same storage device used to store a single traditional chock.

In certain embodiments, body 1202 includes steel inserts for reinforcement, hooks, mandrels, ratchet wheels, pawls, levers, axles, and/or fasteners. Additionally, or alternatively, a bottom of a body 1202 may comprise molded squares that key into a grated panel 112 (e.g., between longitudinal and cross-car grate wires) and/or molded slots for horizontal and/or vertical grate wires of grate panel 112, thereby preventing horizontal and vertical movement when body 1202 is secured to grated panel 112. Molded slots in a bottom surface of body 1202 may each have a raised surface that pinches a respective grate wire to keep body 1202 stationary when a strap 110 is being tightened around a tire of a vehicle 103. In certain embodiments, body 1202 may comprise any suitable number and combination of mechanisms for locking body 1202 to grated panel 112.

In general, ratchet 1200 utilizes hooks 1204 to engage a grated panel 112 of deck 104 via grate wires of grated panel 112. Hooks 1204 of ratchet 1200 may be substantially similar to hooks 116, hooks 134, and hooks 504 described above with respect to FIGS. 1 through 2J and FIG. 5. In the illustrated embodiment, hooks 1204 may be rearward-facing hooks such that the mouths of hooks 1204 face away from the tire tread of a vehicle 103 being restrained. It should be understood, however, that hooks 1204 may configured in any suitable manner. In particular, the present disclosure contemplates hooks 1204 having any suitable shape or configuration. For example, hooks 1204 may be forward-facing hooks, rearward-facing hooks, side-facing hooks, any other suitable hooks, and/or any combination of the preceding. Furthermore, ratchet 1200 may comprise any suitable number and combination of hooks 1204.

Mandrel 1206 may be coupled to or otherwise integrated with body 1202 of ratchet 1200. For example, mandrel 1206 may be mounted on a rotating clevis 1216 (which also may be referred to as a pivoting latch) attached to body 1202. As such, mandrel 1206 may rotate up towards a tire of a vehicle 103 when a strap 110 is being tightened around a portion of the tire by ratchet 1200 and rotate downwards when the strap force is released. Mandrel 1206 may include a strap slot 1212 and may be made of steel and/or any other suitable material.

Mandrel 1206 may be configured to couple one end of a strap 110 to ratchet 1200 via strap slot 1212 and operable to rotate to tighten strap 110 around a tire of a vehicle 103. Release lever 1210 of ratchet 1200 may keep mandrel 1206 from freewheeling when tension is applied during rotation. In certain embodiments, mandrel 1206 may rotate freely when release lever 1210 is decoupled from mandrel 1206 (e.g., for strap removal). In such embodiments, mandrel 1206 may be configured with low friction bushings to allow mandrel 1206 to freewheel when not restrained. In general, mandrel 1206 may facilitate increasing the tension of strap 110 of the vehicle restraint assembly on a tire of a vehicle, while release lever 1210 may facilitate decreasing the tension of strap 110 on the tire of the vehicle.

A pawl 1218 of release lever 1210 may lock rotation of mandrel 1206 via a ratchet wheel 1208. As such, ratchet 1200 (and mandrel 1206) may not release the tightening force around a tire of a vehicle unless pawl 1218 has been disengaged. In certain embodiments, pawl 1218 may be configured such that a downward force rotates mandrel 1206 and tightens strap 110. In certain embodiments, when pawl 1218 is engaged with ratchet wheel 1208, mandrel 1206 may rotate freely in one direction. For example, pawl 1218 may slip over the teeth of ratchet wheel 1208 (even when engaged with the ratchet wheel 1208) if mandrel 1206 is rotated one direction. On the other hand, pawl 1218 may lock mandrel 1206 in place if mandrel 1206 is rotated another direction. In certain embodiments, release lever 1210 may be used to disengage pawl 1218 from ratchet wheel 1208, and thereby decrease the tension of strap 110 on the tire of the vehicle.

As illustrated in FIG. 12, rotating clevis 1216 may rotate around a pivot point of a pivot 1221 of body 1202 and may include a forward-facing hook 1220 configured to engage a grate wire of grate panel 112 when strap 110 is tightened around a tire of a vehicle 103. In such an embodiment, the tension in strap 110 rotates rotating clevis 1216 upward along pivot 1221 to lock forward-facing hook 1220 onto a grate wire of grated panel 112. Decreasing the tension in strap 110 may rotate rotating clevis 1216 downward along pivot 1221 to unlock forward-facing hook 1220 from the grate wire. Body 1202 (and ratchet 1200) may then be removed from grated panel 112 by pulling body 1202 backwards (to the left in FIG. 12). In certain embodiments, forward-facing hook 1220 may interlock with a rearward-facing hook 1204 such that a grate wire of grate panel 112 is trapped between the two hooks.

According to certain embodiments, ratchet 1200 may remain securely locked to grated panel 112 when forward and rearward impacts occur during transportation. For example, when strap 110 is tightened around a tire of a vehicle being transported, a forward impact will create a strap force upwards and to the left in FIG. 12, which will not unlock forward-facing hook 1220 from grated panel 112. As another example, a rearward impact will create a strap force upwards and to the right in FIG. 12, which also will not unlock forward-facing hook 1220 from grated panel 112. To the contrary, rotating clevis 1216 (and forward-facing hook 1220) will be pulled further into a locked position.

As illustrated in FIG. 13, in certain embodiments, torsion springs 1222 may be used to keep rotating clevis 1216 and hook 1220 in an unlocked position, thereby allowing body 1202 to be secured to grated panel 112 via hooks 1204 prior to tightening strap 110. Alternatively, or in addition to, torsion springs 1222 may be used to keep rotating clevis 1216 and hook 1220 in a locked position.

Although particular examples of ratchet 1200 have been described, the present disclosure contemplates any suitable ratchet 1200 comprising any suitable components configured in any suitable manner, according to particular needs. In addition, any component of ratchet 1200 may be separate from or integral to any other component of ratchet 1200. Furthermore, although the features of FIGS. 12 through 13 have been described with respect to a ratchet 1200, this disclosure contemplates implementing any number and combination of those features into an anchor, such as an anchor 108 of system 100.

Figure 14:
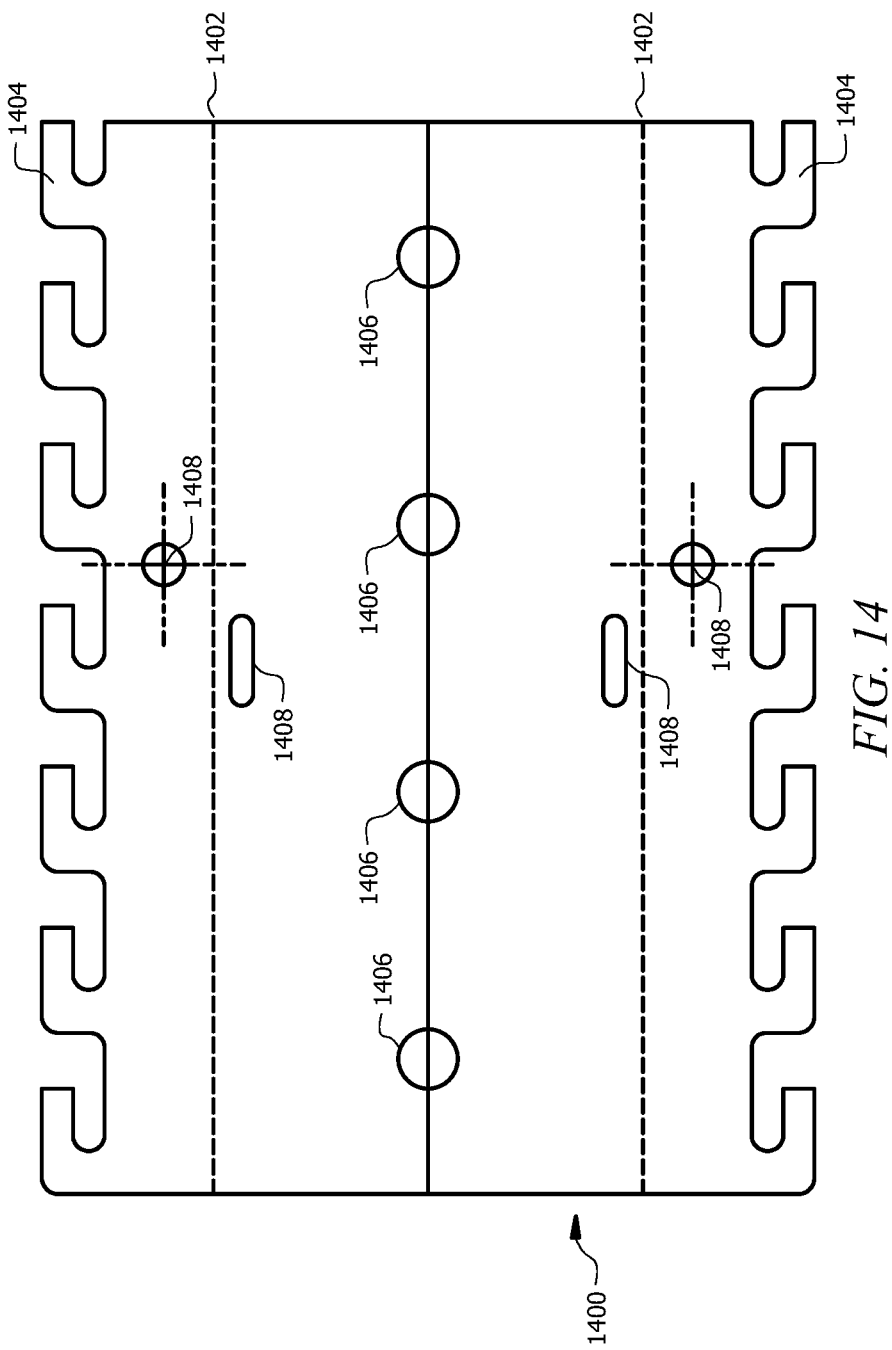
FIG. 14 illustrates an example of a restraint body of a system for restraining a vehicle in accordance with an embodiment of the present disclosure.

FIG. 14 illustrates an example of a restraint body of a system for restraining a vehicle in accordance with an embodiment of the present disclosure. A restraint body 1400 may refer to a base frame of a vehicle restraint, such as a ratchet or an anchor (e.g., a ratchet 106 or an anchor 108 of a system 100 and/or any other ratchet or anchor described above). Example bodies 1400 may be made from stamped galvanized steel, plastic, and/or any other suitable material. In certain embodiments, body 1400 may be bent at bend lines 1402 to form a frame of a ratchet or an anchor.

Body 1400 generally includes stamped teeth 1404. Stamped teeth 1404 may refer to hooks (e.g., hooks 116 of ratchet 106, hooks 134 of anchor 108, etc.) and may be configured to lock an anchor and/or ratchet to a grated panel via one or more grate wires, as described above with respect to FIGS. 1 through 13. The present disclosure contemplates teeth 1404 having any suitable shape or configuration.

Body 1400 also may include weld plug holes 1406 and torsion spring holes 1408. Weld plug holes 1406 may be used to couple additional teeth to a body 1400 of a ratchet or anchor. Torsion spring holes 1408 may be used to couple a torsion spring (e.g., pivot 1221 configured with torsion springs 1222 of FIG. 13) to a body 1400 of a ratchet or anchor.

Although particular examples of body 1400 have been described, the present disclosure contemplates any suitable body 1400 comprising any suitable components configured in any suitable manner, according to particular needs. In addition, any component of body 1400 may be separate from or integral to any other component of body 1400.

Figure 15:
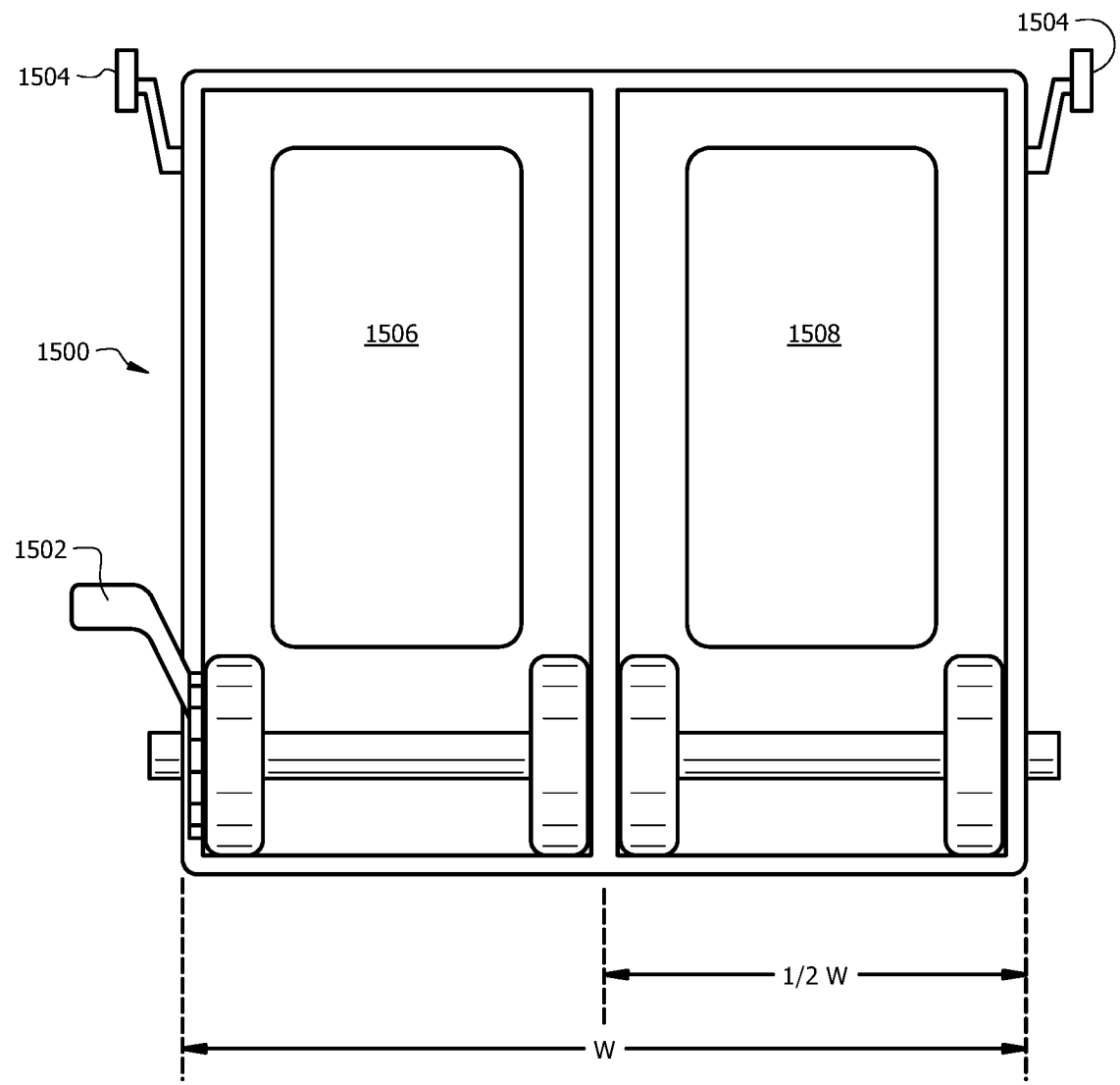
FIG. 15 illustrates a top view of an example of an existing storage device in accordance with an embodiment of the present disclosure.

FIG. 15 illustrates a top view of an example of an existing storage device in accordance with an embodiment of the present disclosure. Storage device 1500 may refer to a chock pan located on side screens of an autorack 102 and may be configured to store a single chock of a conventional vehicle restraint system. Storage device 1500 may include a release lever 1502 and base lock handles 1504. Example storage devices 1500 may be made from plastic, streel, and/or any other suitable material, such as aluminum, galvanized steel, stainless steel, etc.

As described above, a body (e.g., a base) of a ratchet (e.g., body 114 of ratchet 106) and a body (e.g., a base) of an anchor (e.g., body 132 of anchor 108) are typically about half the width of a traditional chock used in existing vehicle restraint systems. As a result, two vehicle restraints, such as ratchet 1506 and anchor 1508, may be stored in the same storage device 1500 used to store a single chock of a conventional vehicle restraint system, thereby reducing the number of storage devices 1500 required to store vehicle restraint systems of a transport 102.

Although particular examples of storage device 1500 have been described, the present disclosure contemplates any suitable storage device 1500 comprising any suitable components configured in any suitable manner, according to particular needs.

Figure 16A:
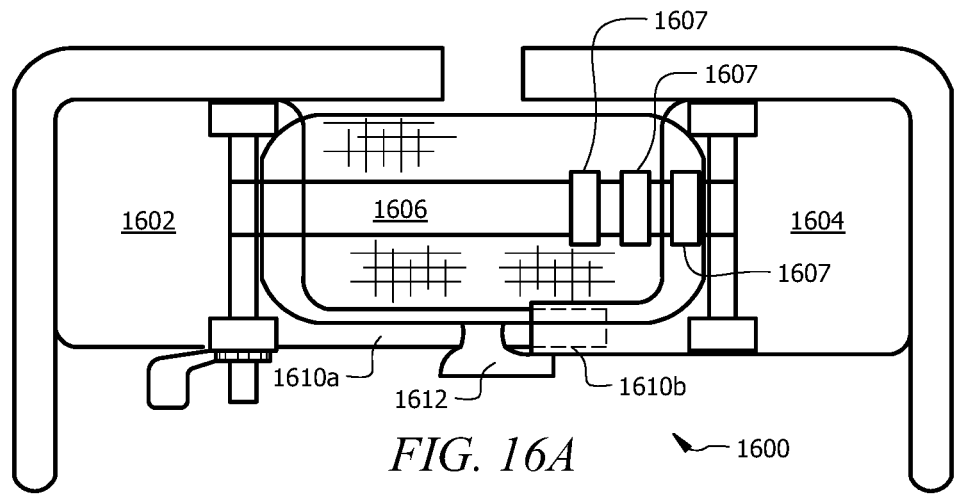
FIGS. 16A and 16B illustrate a top view and a side view, respectively, of an example of a system for restraining a vehicle in accordance with an embodiment of the present disclosure.
Figure 16B:
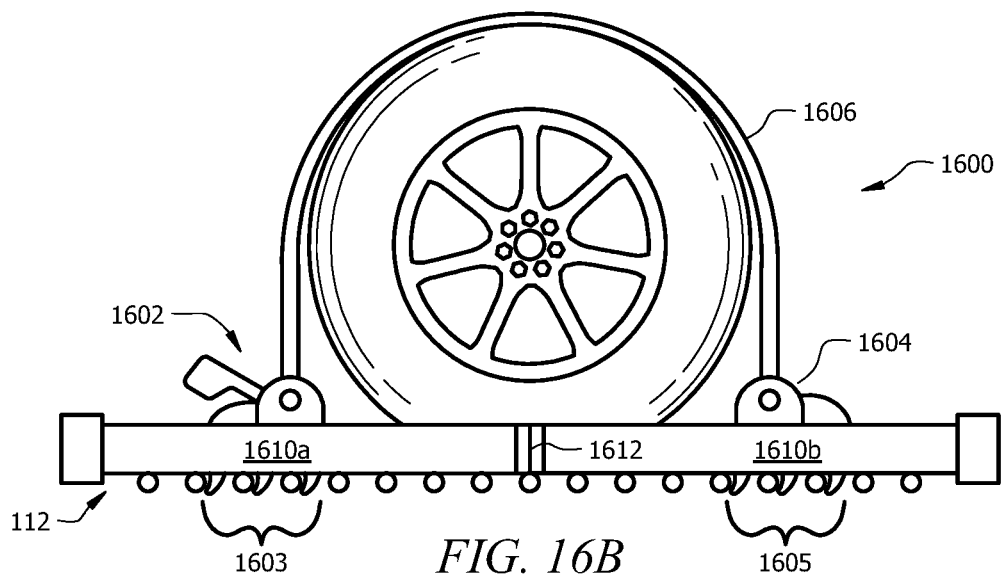

FIGS. 16A and 16B illustrate a top view and a side view, respectively, of an example of a system for restraining a vehicle in accordance with an embodiment of the present disclosure. System 1600 may include a ratchet 1602 with hooks 1603, an anchor 1604 with hooks 1605, and a strap 1606 with cleats 1607. In general, as described above with respect to FIGS. 1 through 2J, ratchet 1602, anchor 1604, and strap 1606 are used to secure a tire of a vehicle 103 to a deck 104 of a transport, such as transport 102, via one or more grated panels 112. Ratchet 1602, anchor 1604, and strap 1606 may be used in place of traditional chock restraint systems.

In certain embodiments, system 1600 may include square tubes 1610 (e.g., 1610a and 1610b) configured to slide into each other to lock into a grated panel 112 and to add track stiffening. In such embodiments, a first end of a square tube 1610a may be configured to couple to ratchet 1602 and a first end of a square tube 1610b may be configured to couple to anchor 1604. A second end of square tube 1610a is configured to couple to a second end of square tube 1610b. Square tube 1610a and square tube 1610b may be coupled together by a toggle lock 1612 and/or any other suitable locking mechanism.

Figure 16C:
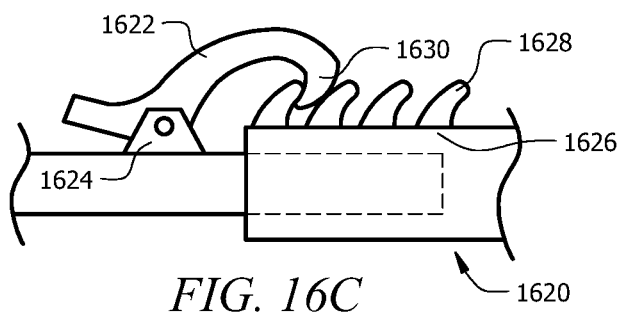
FIG. 16C illustrates a side view of an example locking mechanism of a system for restraining a vehicle in accordance with an embodiment of the present disclosure.

FIG. 16C illustrates a side view of an example locking mechanism of a system for restraining a vehicle in accordance with an embodiment of the present disclosure. A locking mechanism 1620 of system 1600 may be used to couple and lock together an end of square tube 1610a to an end of square tube 1610b. In such an embodiment, a release lever 1622 with a torsion spring 1624 may be coupled to one of square tubes 1610a and 1610b and a rack 1626 with fine teeth 1628 may be coupled to the other one of square tubes 1610a and 1610b. Release lever 1622 may lock onto one or more teeth 1628 to couple square tubes 1610a and 1610b together. Square tubes 1610a and 1610b may be decoupled by disengaging a pawl 1630 of release lever 1622 from teeth 1628 via release lever 1622.

Although particular examples of system 1600 have been described with respect to FIGS. 16A through 16C, the present disclosure contemplates any suitable system 1600 comprising any suitable components configured in any suitable manner, according to particular needs. In addition, any component of system 1600 may be separate from or integral to any other component of system 1600.

Figure 17:
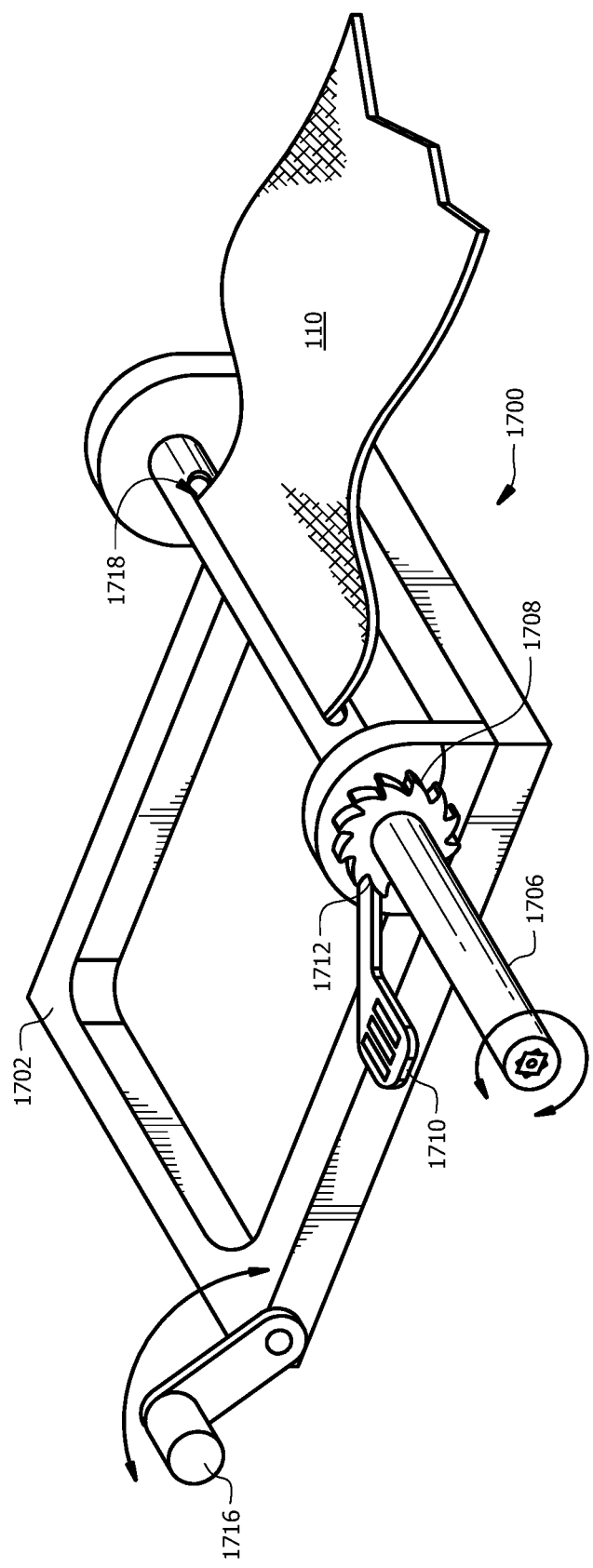
FIG. 17 illustrates a perspective view of an example ratchet of a system for restraining a vehicle in accordance with an embodiment of the present disclosure.

FIG. 17 illustrates a perspective view of an example ratchet of a system for restraining a vehicle in accordance with an embodiment of the present disclosure. Ratchet 1700 generally facilitates restraining a vehicle 103 to a deck 104 of a transport 102 and is configured to couple an end of a strap (e.g., strap 110) to one or more grate wires of grated panel 112 of deck 104.

Ratchet 1700 may include a body 1702, hooks 1704 (not shown), mandrel 1706, ratchet wheel 1708, release lever 1710, pawl 1712, locking lug 1714 (not shown), lug lever 1716, and strap slot 1718. Body 1702, hooks 1704 (not shown), mandrel 1706, ratchet wheel 1708, release lever 1710, pawl 1712, locking lug 1714 (not shown), lug lever 1716, and strap slot 1718 of ratchet 1700 may be substantially similar to body 114, hooks 116, mandrel 118, ratchet wheel 120, release lever 122, locking lug 124, lug lever 126, and strap slot 128 of ratchet 106 (described above with respect to FIGS. 1 through 2J).

Although particular examples of ratchet 1700 have been described, the present disclosure contemplates any suitable ratchet 1700 comprising any suitable components configured in any suitable manner, according to particular needs. In addition, any component of ratchet 1700 may be separate from or integral to any other component of ratchet 1700. Furthermore, although the features of FIG. 17 have been described with respect to a ratchet 1700, this disclosure contemplates implementing any number and combination of those features into an anchor, such as an anchor 108 of system 100.

FIGS. 18A and 18B illustrate a top view and a side view, respectively, of another example of a system for restraining a vehicle in accordance with an embodiment of the present disclosure. System 1800 may refer to a low-profile vehicle restraint system and may include a ratchet 1802, an anchor 1804, and a strap 1806. In general, as described above with respect to FIGS. 1 through 2J, ratchet 1802, anchor 1804, and strap 1806 are used to secure a tire of a vehicle 103 to a deck 104 of a transport, such as transport 102, via one or more grated panels 112. Ratchet 1802, anchor 1804, and strap 1806 may be used in place of traditional chock restraint systems.

FIGS. 19A through 19E illustrate top and side views of another example of a system for restraining a vehicle in accordance with an embodiment of the present disclosure. System 1900 may refer to a "T-Bone" vehicle restraint system and may include a ratchet 1902, an anchor 1904, a strap 1906, and one or more grated panels 112 secured to a deck 104. In certain embodiments, deck 104 may include tire guides and/or track mandrels coupled to the deck along an edge of a grated panel 112. In general, as described above with respect to FIGS. 1 through 2J, ratchet 1902, anchor 1904, and strap 1906 are used to secure a tire of a vehicle 103 to a deck 104 of a transport, such as transport 102, via one or more grated panels 112. Ratchet 1902, anchor 1904, and strap 1906 may be used in place of traditional chock restraint systems.

Figure 19A:
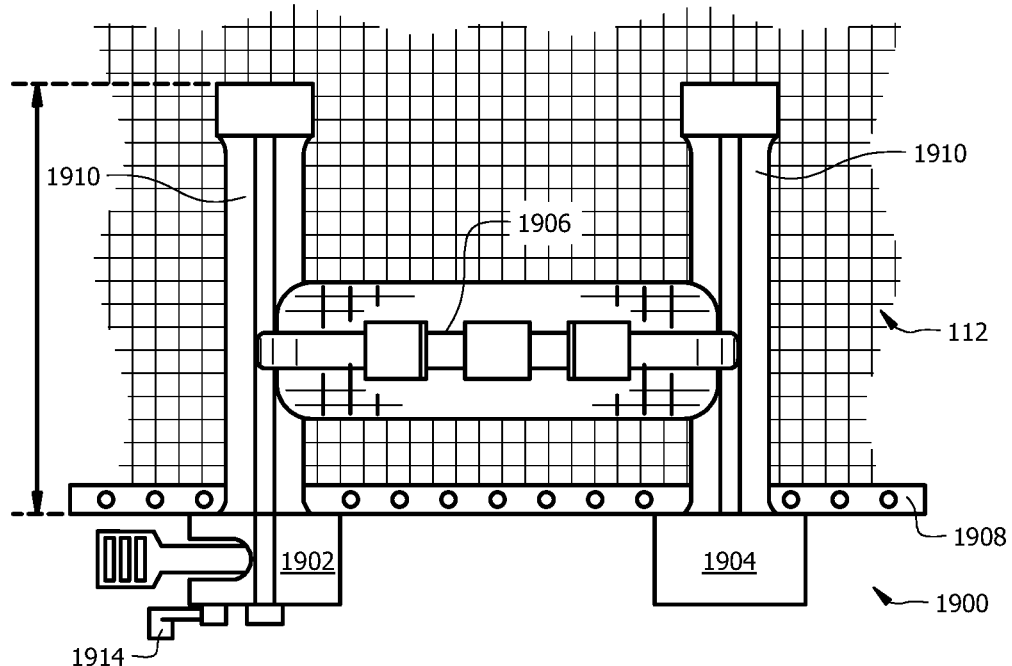
FIGS. 19A through 19E illustrate top and side views of another example of a system for restraining a vehicle in accordance with an embodiment of the present disclosure.
Figure 19B:
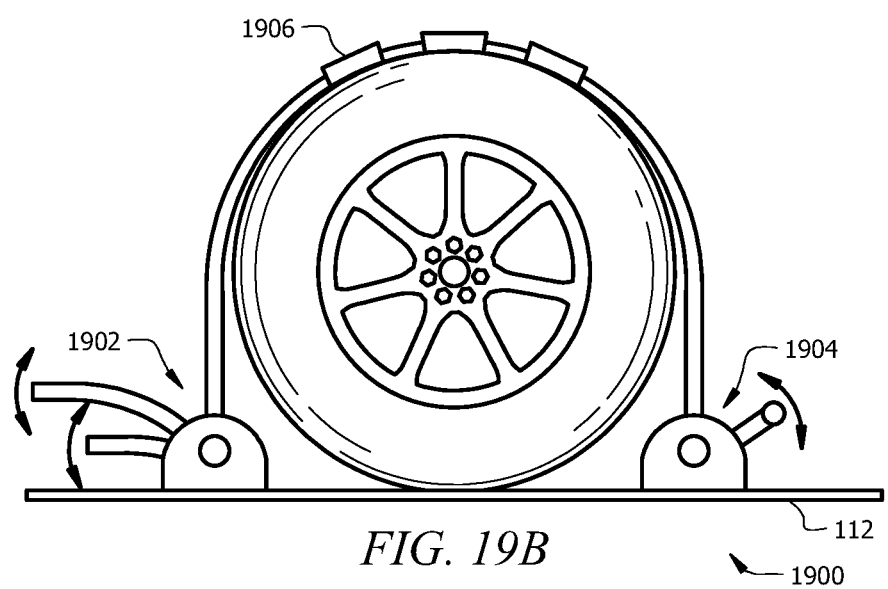
Figure 19C:
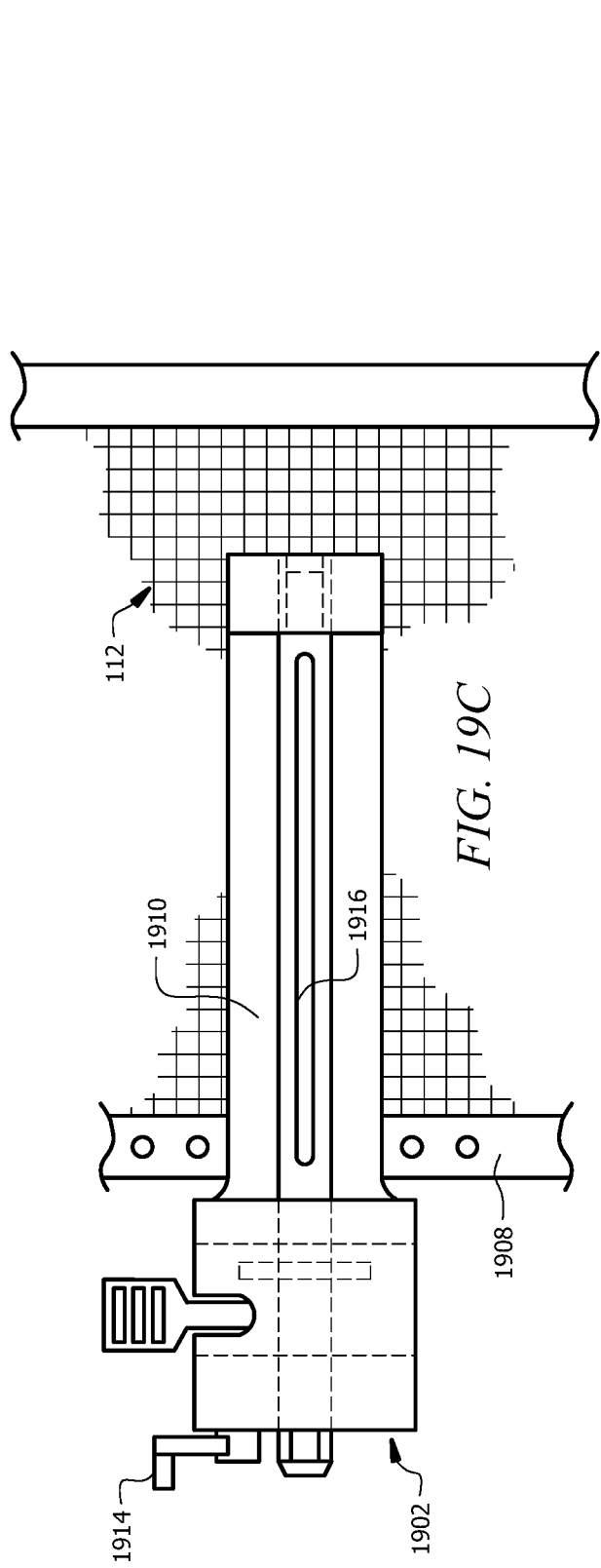
Figure 19E:
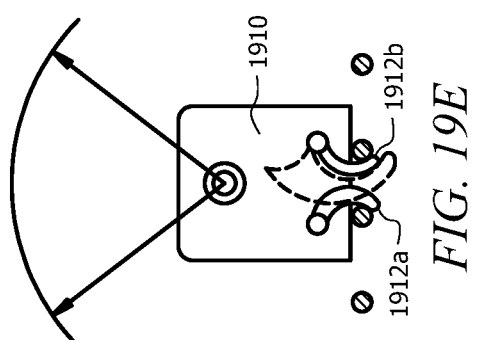
Figure 19D:
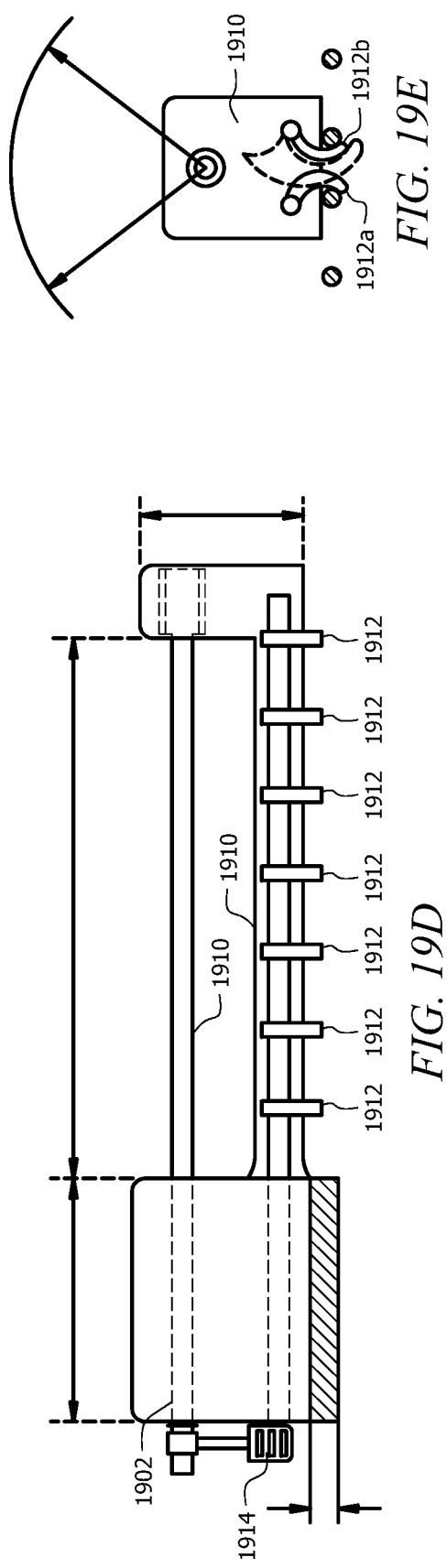

As illustrated in FIGS. 19A and 19C through 19D, ratchet 1902 and anchor 1904 may extend off grated panel 112 past a hinge 1908. A hinge 1908 may be used to couple one or more sides of a grated panel 112 to deck 104 such that grated panel 112 may pivot upwards. In such embodiments, dirt and other debris under grated panel 112 may be cleaned and removed. In certain embodiments, grated panel 112 may include any suitable number of anchors with fasteners to couple grated panel 112 to deck 104 and prevent grated panel 112 from lifting and rotating around a grate hinge 1908.

Ratchet 1902 and anchor 1904 may each include a mandrel 1910 with hooks 1912 configured to engage grated panel 112 and clamp onto one or more grate wires of grated panel 112. Mandrel 1910 may include a mandrel axle with a socket end that may be configured to tighten a strap 110 around a tire of a vehicle 103 when the socket is turned in a clockwise direction and loosen strap 110 when the socket is turned in a counter-clockwise direction. Advantages of the illustrated embodiment may include preventing grated panel 112 from lifting when an upward strap force occurs. Mandrels 1910 may be made from steel and/or any other suitable material. In certain embodiments, a mandrel 1910 may include a strap slot 1916 for coupling an end of a strap 1906 to mandrel 1910.

Hooks 1912 of mandrels 1910 may be substantially similar to hooks 116 and hooks 132 described above with respect to FIGS. 1 through 2J. In certain embodiments, one or more hooks 1912 may be fixed and one or more hooks 1912 may be moveable. For example, referring to FIG. 19E, a hook 1912a of mandrel 1910 may be a fixed hook and may be forward facing such that a mouth of hook 1912a faces toward a tire of a vehicle 103. A hook 1912b of mandrel 1910 may be a rotating hook and may be rearward facing such that a mouth of hook 1912b faces away from a tire of a vehicle 103 when rotated downward into the locking position. Hook 1912b may be configured to lock hook 1912a onto a grate wire of grated panel 112 when rotated to a locked position via a lever, such as a locking lever 1914, or any other suitable mechanism. Lever 1914 may be configured to prevent hook 1912b from rotating or otherwise unlocking from a grate wire of grated panel 112 after being placed in the locked position. In certain embodiments, lever 1914 may be used to unlock hook 1912b from the grate wire (e.g., by rotating lever 1914 upwards) and thereby disengage hook 1219a from grated panel 112.

Referring to FIG. 19D, a ratchet 1902 and an anchor 1904 may include a rubber reaction heel to keep a hinge of a track coupled to an edge of a deck 104 near a grated panel 112 from rising. In certain embodiments, a rubber reaction heel may be approximately 9/16" of an inch. A mandrel 1910 of ratchet 1902 and/or anchor 1904 may be approximately 4.5" inches tall.

Although particular examples of ratchet 1902, anchor 1904, mandrels 1910, and hooks 1912 have been described with respect to FIGS. 19A through 19E, the present disclosure contemplates any suitable ratchet 1902, anchor 1904, mandrels 1910, and hooks 1912 comprising any suitable components configured in any suitable manner, according to particular needs. In addition, any component of ratchet 1902, anchor 1904, mandrels 1910, and hooks 1912 may be separate from or integral to any other component of ratchet 1902, anchor 1904, mandrels 1910, and hooks 1912.

FIG. 20 illustrates a side view of an example of a strap of a system for restraining a vehicle in accordance with an embodiment of the present disclosure. A strap of FIG. 20 may refer to a strap 110 of system 100 of FIGS. 2A through 2J. As described above with respect to FIGS. 2A through 2J, a strap 110 may facilitate securing a vehicle 103 to a deck 104. In particular, strap 110 may be configured to be positioned on a portion of a tire of a vehicle 103 to secure the tire of the vehicle to deck 104. Example straps 110 may be composed of one or more of nylon, rubber, cloth, elastic, elastomeric, and/or any other suitable material. A strap 110 composed of elastic or elastomeric components may allow strap 110 to stretch and prevent damage to a grated panel 112 from high strap forces. In certain embodiments, strap 110 may be approximately 1.75" to 2" inches wide. Strap 110 also may have a working load of approximately 2,300 pounds and an ultimate strength of approximately 7,000 pounds.

In general, a first end of strap 110 is coupled to a ratchet, such as ratchet 106 of FIGS. 2A through 2J, and a second end of strap 110 is coupled to an anchor, such as anchor 108 of FIGS. 2A through 2J. It should be understood that strap 110 may be coupled to any suitable ratchet and anchor and may be configured in any suitable manner. In certain embodiments, ratchet 106 may be used to tighten strap 110 around a tire of a vehicle 103. In such embodiments, friction is created between the tire tread and strap 110, which in turn retards the tire from rotating during transportation.

In certain embodiments, strap 110 may be a reversible strap (e.g., double-sided) and may include cleats 2000. Example cleats 2000 may be composed of one or more of polymer, rubber, and/or any other suitable material. Each cleat 2000 may have raised fins 2002 located on both sides of the cleat. Fins 2002 generally are configured to be inserted into the tread of a tire of a vehicle 103 to help position strap 110 on the tire and prevent strap 110 from sliding off of the tire.

Although particular examples of strap 110 have been described, the present disclosure contemplates any suitable strap 110 comprising any suitable components configured in any suitable manner, according to particular needs. In addition, any component of strap 110 may be separate from or integral to any other component of strap 110 and system 100.

Figure 21:
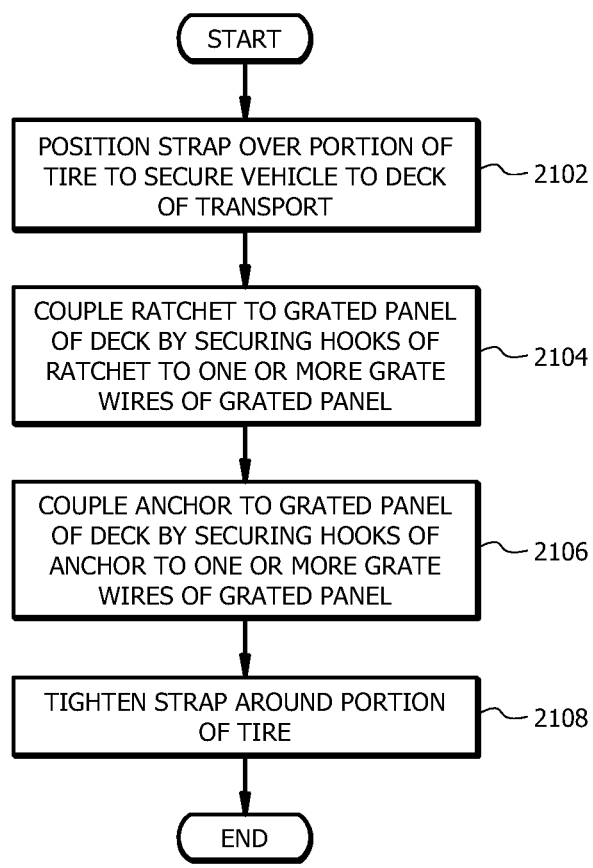
FIG. 21 illustrates an example method for restraining a vehicle in accordance with an embodiment of the present disclosure.

FIG. 21 illustrates an example method for restraining a vehicle in accordance with an embodiment of the present disclosure. The method begins at step 2102 where a strap 110 is positioned over a portion of a tire of a vehicle 103 to secure the vehicle to a deck 104 of a transport 102 (e.g., an autorack). A first end of strap 110 may be coupled to a ratchet 106 and a second end of strap 110 may be coupled to an anchor 108.

At step 2104, ratchet 106 may be coupled to a grated panel 112 of deck 104 by securing hooks 116 of ratchet 106 to one or more grate wires of grated panel 112 on a first side of a tire of a vehicle 103.

At step 2106, anchor 108 may be coupled to grated panel 112 of deck 104 by securing hooks 134 of anchor 108 to one or more grate wires of grated panel 112 on a second side of the tire of vehicle 103.

At step 2108, strap 110 may be tightened around the portion of the tire of vehicle 103 using ratchet 106, thereby properly restraining vehicle 103 to deck 104 for shipment.

After performing step 2108, the method may end.

Some of the steps illustrated in FIG. 21 may be combined, modified, or deleted where appropriate, and additional steps may also be added to the flowchart. Additionally, steps may be performed in any suitable order without departing from the scope of the disclosure. For example, the method may perform step 2106 before performing step 2102 and/or step 2104. As another example, step 2104 may be performed before step 2102 and/or step 2106.

Teachings of the present disclosure may be satisfactorily used to facilitate restraining one or more vehicles to one or more decks of a transport. Modifications, additions, or omissions may be made to the systems described herein without departing from the scope of the present disclosure. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

Modifications, additions, or omissions may be made to the methods described herein without departing from the scope of the present disclosure. For example, the steps may be combined, modified, or deleted where appropriate, and additional steps may be added. Additionally, the steps may be performed in any suitable order without departing from the scope of the present disclosure.

Although embodiments of the present disclosure and their advantages have been described in detail, it should be understood that various changes, substitutions and alternations can be made herein without departing from the spirit and scope of the present disclosure as defined by the following claims. Moreover, although particular embodiments have been described herein, a myriad of changes, variations, alterations, transformations, substitutions, and modifications may be suggested to one skilled in the art, and it is intended that the present disclosure encompass such changes, variations, alterations, transformations, substitutions, and modifications as fall within the scope of the appended claims. For example, although particular embodiments of the disclosure have been described with reference to a number of elements included in a system for restraining a vehicle, these elements may be combined, rearranged or positioned in order to accommodate particular storage requirements or needs. Various embodiments contemplate great flexibility in the vehicle restraint system and its components. Additionally, while some embodiments are described with respect to an autorack, particular embodiments may be used for any type of transport.

What is claimed is:

1. A system comprising:
a deck of a transport, the deck comprising one or more grated panels;
a vehicle restraint assembly configured to secure a vehicle to the deck of the transport, the vehicle restraint assembly comprising:
an anchor coupled to a first end of a strap, the anchor comprising:
a first row of a first plurality of hooks and a second row of the first plurality of hooks, the first row of the first plurality of hooks and the second row of the first plurality of hooks each configured to couple the anchor to the deck of the transport through one or more grate wires of the one or more grated panels; and
a locking lug to configured to automatically rotate downward between two or more grate wires of the one or more grated panels to lock the anchor into place on the deck when the first row of the first plurality of hooks and the second row of the first plurality hooks each engage the one or more grate wires of the one or more grated panels; and
a ratchet coupled to a second end of the strap, the ratchet comprising a first row of a second plurality of hooks and a second row of the second plurality of hooks, the first row of the second plurality of hooks and the second row of the second plurality of hooks each configured to couple the ratchet to the deck of the transport through one or more grate wires of the one or more grated panels.

2. The system of claim 1, wherein:
the first and second rows of the first plurality of hooks are each configured to couple the anchor to the deck of the transport through one or more grate wires of the one or more grated panels by engaging the one or more grate wires in response to a first force in a first direction being applied to the anchor; and
the first and second rows of the second plurality of hooks are each configured to couple the ratchet to the deck of the transport through one or more grate wires of the one or more grated panels by engaging the one or more grate wires in response to a second force in a second direction opposite the first direction being applied to the ratchet.

3. The system of claim 1, wherein:
the first row of the first plurality of hooks of the anchor comprises at least a first hook facing a first direction; and
the second row of the first plurality of hooks of the anchor comprises at least a second hook facing a second direction opposite the first direction.

4. The system of claim 3, wherein:
the first hook is a fixed hook; and
the second hook is a rotating hook configured to lock the fixed hook in place when rotated downwards into a locked position.

5. The system of claim 1, wherein:
the first row of the second plurality of hooks of the ratchet comprises at least a first hook facing a first direction; and
the second row of the second plurality of hooks of the ratchet comprises at least a second hook facing a second direction opposite the first direction.

6. The system of claim 5, wherein:
the first hook is a fixed hook; and
the second hook is a rotating hook configured to lock the fixed hook in place when rotated downwards into a locked position.

7. The system of claim 1, wherein the anchor further comprises a lug lever coupled to the locking lug, the lug lever configured to release the anchor from the deck when a force greater than a predetermined force is produced against the lug lever.

8. The system of claim 1, wherein the ratchet further comprises a locking lug configured to automatically rotate downward between two or more grate wires of the one or more grated panels to lock the ratchet into place on the deck in response to the first row of the second plurality of hooks and the second row of the second plurality of hooks each engaging the one or more grate wires of the one or more grated panels.

9. The system of claim 8, wherein the ratchet further comprises a lug lever coupled to the locking lug, the lug lever configured to release the ratchet from the deck when a force greater than a predetermined force is produced against the lug lever.

10. The system of claim 1, wherein the anchor is configured to be coupled to the deck on a first side of a tire of the vehicle.

11. The system of claim 10, wherein the ratchet is configured to be coupled to the deck on a second side of the tire of the vehicle.

12. The system of claim 1, wherein the ratchet is operable to tighten the strap around a portion of a tire of the vehicle.

13. A method comprising:
positioning a strap of a vehicle restraint assembly over a portion of a tire of a vehicle to secure the vehicle to a deck of a transport, the deck comprising one or more grated panels;
coupling a first end of the strap to an anchor of the vehicle restraint assembly, the anchor comprising:
a first row of a first plurality of hooks and a second row of the first plurality of hooks; and
a locking lug configured to automatically rotate downward between two or more grate wires of the one or more grated panels to lock the anchor into place on the deck when the first row of the first plurality of hooks and the second row of the first plurality hooks each engage the one or more grate wires of the one or more grated panels;
coupling each of the first row of the first plurality of hooks and the second row of the first plurality of hooks of the anchor to the deck of the transport through one or more grate wires of the one or more grated panels;
coupling a second end of the strap to a ratchet of the vehicle restraint assembly, the ratchet comprising a first row of a second plurality of hooks and a second row of the second plurality of hooks; and
coupling each of the first row of the second plurality of hooks and the second row of the second plurality of hooks of the ratchet to the deck of the transport through one or more grate wires of the one or more grated panels.

14. The method of claim 13, wherein:
the first and second rows of the first plurality of hooks of the anchor are coupled to the deck on a first side of the tire of the vehicle; and
the first and second rows of the second plurality of hooks of the ratchet are coupled to the deck on a second side of the tire of the vehicle.

15. The method of claim 13, further comprising tightening the strap around the portion of the tire of the vehicle using the ratchet.

16. The method of claim 13, wherein:
coupling each of the first row of the first plurality of hooks and the second row of the first plurality of hooks of the anchor to the deck of the transport through the one or more grate wires of the one or more grated panels comprises applying a first force in a first direction to the anchor to couple the first plurality of hooks to the one or more grate wires; and
coupling each of the first row of the second plurality of hooks and the second row of the second plurality of hooks of the ratchet to the deck of the transport through the one or more grate wires of the one or more grated panels comprises applying a second force in a second direction opposite the first direction to the ratchet to couple the second plurality of hooks to the one or more grate wires.

17. The method of claim 13, wherein the ratchet comprises a locking lug configured to automatically rotate downward between two or more grate wires of the one or more grated panels to lock the second plurality of hooks onto the one or more grated panels when each of the first row of the second plurality of hooks and the second row of the second plurality of hooks engage the one or more grate wires of the one or more grated panels.

18. The method of claim 13, wherein:
the first row of the first plurality of hooks of the anchor comprises at least a first hook facing a first direction; and
the second row of the first plurality of hooks of the anchor comprises at least a second hook facing a second direction opposite the first direction.

19. The method of claim 13, wherein:
the first row of the second plurality of hooks of the ratchet comprises at least a first hook facing a first direction; and
the second row of the second plurality of hooks of the ratchet comprises at least a second hook facing a second direction opposite the first direction.

\* \* \* \* \*